United States Patent
Sanchez De La Fuente et al.

(10) Patent No.: US 10,425,652 B2
(45) Date of Patent: Sep. 24, 2019

(54) VIDEO COMPOSITION

(71) Applicant: Fraunhofer-Gesellschaft zur Foerderung der angewandten Forschung e.V., Munich (DE)

(72) Inventors: Yago Sanchez De La Fuente, Berlin (DE); Robert Skupin, Berlin (DE); Thomas Schierl, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/435,147

(22) Filed: Feb. 16, 2017

(65) Prior Publication Data

US 2017/0163994 A1    Jun. 8, 2017

Related U.S. Application Data

(63) Continuation of application No. PCT/EP2014/067757, filed on Aug. 20, 2014.

(51) Int. Cl.
*H04N 19/51* (2014.01)
*H04N 19/40* (2014.01)
(Continued)

(52) U.S. Cl.
CPC ......... *H04N 19/40* (2014.11); *H04N 19/105* (2014.11); *H04N 19/13* (2014.11); *H04N 19/159* (2014.11); *H04N 19/31* (2014.11); *H04N 19/436* (2014.11); *H04N 19/48* (2014.11); *H04N 19/51* (2014.11); *H04N 19/61* (2014.11); *H04N 19/70* (2014.11); *H04N 21/4312* (2013.01);
(Continued)

(58) Field of Classification Search
CPC ........ H04N 19/40; H04N 19/31; H04N 19/13; H04N 19/159; H04N 19/105; H04N 19/70; H04N 19/51; H04N 19/436; H04N 19/61; H04N 21/4312; H04N 19/48; H04N 21/816; H04N 19/177; H04N 19/176; H04N 19/172; H04N 19/174
USPC .................................................. 375/240.12
See application file for complete search history.

(56) References Cited

U.S. PATENT DOCUMENTS 6,901,110 B1 *   5/2005   Tsougarakis ........... H04N 5/145
                                                          348/E5.066
2004/0017951 A1   1/2004   Koto et al.
(Continued)

FOREIGN PATENT DOCUMENTS

JP   H11341436 A   12/1999
JP   2008066851 A   3/2008
(Continued)

OTHER PUBLICATIONS

Shete et al, Real time panorama composition for video surveillance using GPU (Year: 2016).*
(Continued)

*Primary Examiner* — Shan E Elahi
(74) *Attorney, Agent, or Firm* — Perkins Coie LLP; Michael A. Glenn

(57) ABSTRACT

Video composition is performed by filling a portion of the composed video data steam by collecting and copying, and another portion added synthetically by referencing, via motion-compensated temporal prediction, the other portion of the composed video data stream, obtained by collecting and copying.

25 Claims, 23 Drawing Sheets

(51) Int. Cl.

| | |
|---|---|
| *H04N 21/431* | (2011.01) |
| *H04N 21/81* | (2011.01) |
| *H04N 19/48* | (2014.01) |
| *H04N 19/61* | (2014.01) |
| *H04N 19/436* | (2014.01) |
| *H04N 19/105* | (2014.01) |
| *H04N 19/13* | (2014.01) |
| *H04N 19/159* | (2014.01) |
| *H04N 19/31* | (2014.01) |
| *H04N 19/70* | (2014.01) |
| *H04N 19/172* | (2014.01) |
| *H04N 19/174* | (2014.01) |
| *H04N 19/176* | (2014.01) |
| *H04N 19/177* | (2014.01) |

(52) U.S. Cl.
CPC ......... *H04N 21/816* (2013.01); *H04N 19/172* (2014.11); *H04N 19/174* (2014.11); *H04N 19/176* (2014.11); *H04N 19/177* (2014.11)

(56) References Cited

U.S. PATENT DOCUMENTS

| | | | |
|---|---|---|---|
| 2005/0008240 A1* | 1/2005 | Banerji | H04N 5/2624 382/238 |
| 2006/0170762 A1* | 8/2006 | Tanaka | H04N 5/2624 348/14.09 |
| 2008/0056358 A1 | 3/2008 | Fuchie et al. | |
| 2011/0280307 A1* | 11/2011 | MacInnis | G06T 9/00 375/240.15 |
| 2013/0058414 A1 | 3/2013 | Tsuru | |
| 2014/0098881 A1* | 4/2014 | Chen | H04N 19/33 375/240.16 |
| 2014/0133567 A1* | 5/2014 | Rusanovskyy | H04N 19/597 375/240.16 |
| 2014/0341289 A1* | 11/2014 | Schwarz | H04N 19/597 375/240.16 |
| 2014/0376609 A1* | 12/2014 | Barkley | H04N 7/147 375/240.02 |
| 2015/0030073 A1* | 1/2015 | Chen | H04N 19/597 375/240.16 |

FOREIGN PATENT DOCUMENTS

| | | | | |
|---|---|---|---|---|
| JP | 2013055587 A | 3/2013 | | |
| KR | 20030078772 A | 10/2003 | | |
| KR | 20140092902 A | 7/2014 | | |
| KR | 20150065841 A | 6/2015 | | |
| WO | 2013/068547 A2 | 5/2013 | | |
| WO | 2014/010537 A1 | 1/2014 | | |
| WO | WO-2014010537 A1 * | 1/2014 | ........... | H04N 19/597 |

OTHER PUBLICATIONS

Sanchez De La Fuente et al., "Low Complexity Cloud-video-Mixing Using HEVC", Proceedings of IEEE Consumer Communications and Networking Conference, Las Vegas, NV, USA, Jan. 2014, pp. 415-420.

Sullivan et al., "Overview of the high efficiency video coding (HEVC) standard", Circuits and Systems for Video Technology, IEEE Transactions, 22.12 (2012), 19 pages.

* cited by examiner

| bitstream_composition_characteristics(payloadSize ) { | Descriptor |
|---|---|
| composition_enabled_type | ue(v) |
| if(composition_enabled_type==2){ | |
| max_temporal_id_ plus1_TMVP_disabled | u(3) |
| | |
| } | |

FIG 22

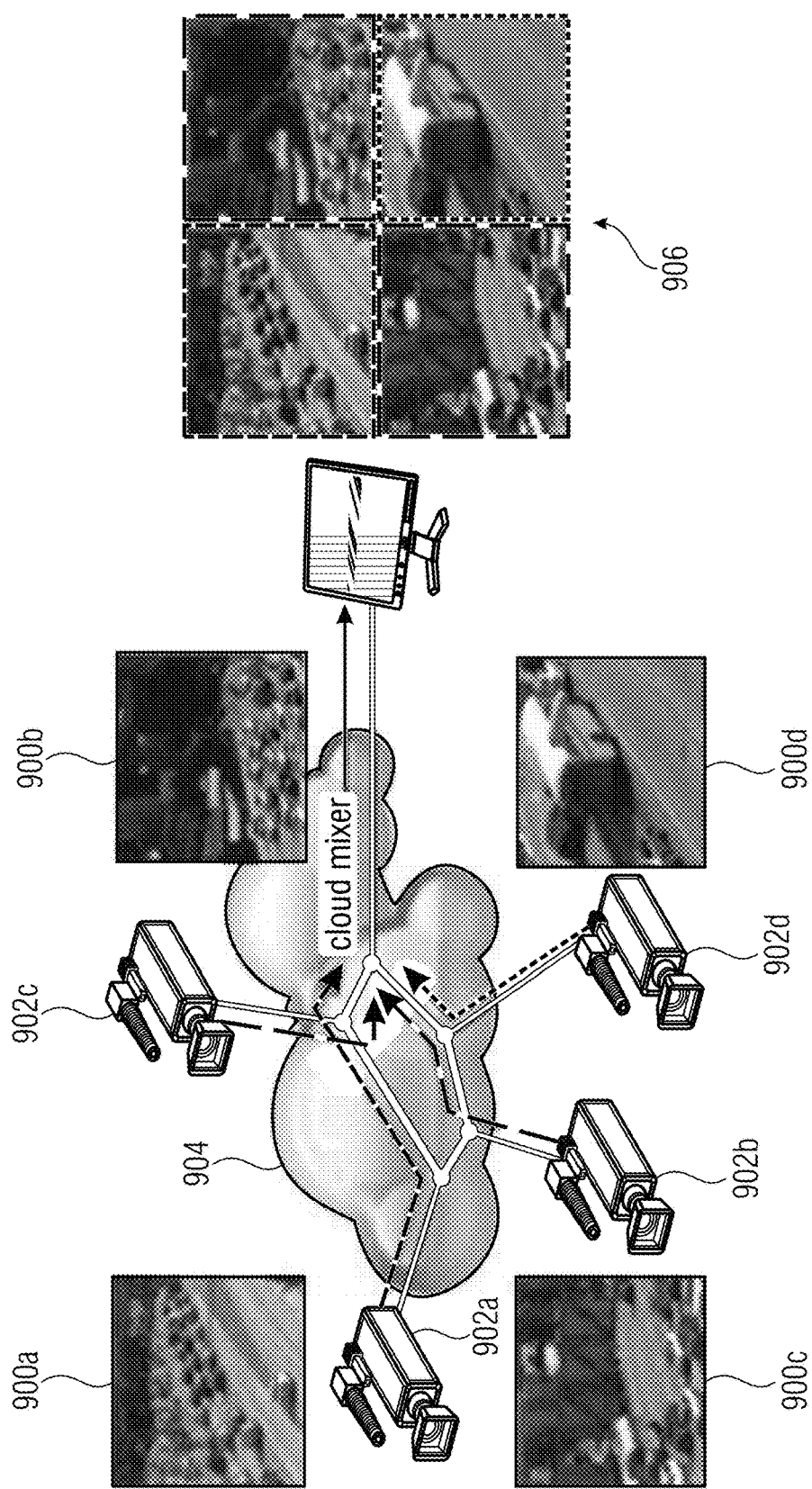

VIDEO COMPOSITION

CROSS-REFERENCE TO RELATED APPLICATIONS

This application is a continuation of copending International Application No. PCT/EP2014/067757, filed Aug. 20, 2014, which is incorporated herein in its entirety by this reference thereto.

The present application is concerned with video composition, such as the composing of a composed video data stream using one or a plurality of input video data streams.

BACKGROUND OF THE INVENTION

There are a number of applications and use cases like video conferencing, video surveillance, medical applications, panorama streaming, ad-insertion, picture in picture display or video overlay where several dedicated video bitstreams are simultaneously decoded and displayed to a user in a composed form. An illustrative example for such applications is traffic surveillance system with multiple video sources being presented to the user. A problem for such applications is that many devices incorporate only a single hardware video decoder or are otherwise limited in computational, power and/or other resources. Examples of such devices are Set-Top-Boxes (STBs), low-cost TV sets or battery powered mobile devices.

To enable said applications and use cases on such devices, a single video bitstream incorporating the several dedicated video bitstreams has to be created upfront. In order to achieve such a single video bitstream, pixel-domain video processing (e.g. composing such as stitching, merging or mixing) is typically applied, where the different video bitstreams are transcoded into a single bitstream. Transcoding can be implemented using a cascaded video decoder and encoder, which entails decoding the incoming bitstreams, composing a new video from the input bitstreams in the pixel-domain and encoding the new video into a single bitstream. This method can also be referred to as traditional full transcode that includes processing in the uncompressed domain. However, it has a number of drawbacks. First, the repeated encoding of video information is likely to introduce further signal quality degradation through coding artifacts. Second and more important, a full transcoding is computationally complex through the multiple de- and encoding of the in- and outgoing video bitstreams and therefore does not scale well.

Therefore, another approach has been presented in [1], where the video stitching is performed in the compressed domain. The main idea behind [1] is to set constraints at the encoders, e.g. disallowing some motion vector as well as motion vector prediction at picture boundaries, that allow for a low complexity bitstream rewriting process that can be applied to the different bitstreams in order to generate a single bitstream that contains all the videos that are intended to be mixed. This stitching approach is likewise computationally less complex than full transcoding and does not introduce signal quality degradation.

An illustrative example for such a system is shown in FIG. 23 for a video surveillance system using a cloud server infrastructure. As can be seen, multiple video bitstreams 900a-d are sent by different senders 902a-d and are stitched in a cloud mixer 904 to produce a single video bitstream 906.

A more detailed description of the techniques behind the applied stitching process can be found in [1].

Compressed domain processing can be applied to many applications and use cases to allow for low complexity video processing, saving battery life and/or implementation cost. However, the characteristics of each application pose individual problems for compressed domain video processing. Likewise the characteristics and features of a video compression standard/scheme can be utilized to enable low complexity compressed domain processing for new applications.

Problems that are not sufficiently addressed by way of the encoded domain stitching scheme of FIG. 23 occur, for example, if the way of composing the single video bitstream 906 out of the inbound video bitstreams 900a-d shall be subject to changes such as, for example, a rearrangement of inbound video bitstreams within the composed video bitstream 906, a spatial displacement of a certain input video bitstream within the composed video bitstream's 906 picture area or the like. For all of these cases, the composition scheme of FIG. 23 does not work properly due to temporal motion-compensated prediction which ties the individual pictures of the inbound video bitstreams 900a to 900d to each other temporally so that in a rearrangement of an inbound video bitstream without the usage of a detour via the decoded/uncompressed domain, is prohibited except for random access points of an inbound video bitstream represented by intra pictures not using any temporal motion-compensated prediction, which leads to a undesirable momentary increase of bitrate and bandwidth peaks. Thus, without any additional efforts, the freedom in varying the composition of output video bitstream 906 without leaving the compressed domain, would be restricted to take place merely at certain points in time by random access points of an inbound video bitstream not using any temporal motion-compensated prediction. A high frequency of such random access points within the inbound video bitstreams 900a-900d, however, involves a lower compression rate due to the lack of temporal predictors in intra predicted pictures.

SUMMARY

An embodiment may have a video composition apparatus configured to compose a composed video datastream using at least one input video datastream, the composed video datastream and the at least one input video datastream being encoded using motion-compensated temporal prediction, the video composition apparatus being configured to compose the composed video datastream by forming a sequence of inherited pictures of the composed video datastream with filling a spatial portion of the inherited pictures by collecting and copying motion-compensation side information and prediction residual data of the at least one input video datastream, wherein a spatial location of the spatial portion temporally changes from one inherited picture to the next in the sequence of inherited pictures, and inserting at least one no-output picture into the composed video datastream between the inherited pictures of the sequence of inherited pictures, the at least one no-output picture referencing, via motion-compensated temporal prediction, a subset of the inherited pictures.

Another embodiment may have a video composition apparatus configured to compose a composed video datastream out of a plurality of input video datastreams, the composed video datastream and the plurality of input video datastreams being encoded using motion-compensated temporal prediction, the video composition apparatus being configured to compose the composed video datastream by multiplexing the plurality of input video datastreams into a first portion of pictures of the composed video datastream by collecting and copying motion-compensation side information and prediction residual data of the plurality of input video datastreams into the first portion of the composed video datastream, and filling a second portion of the pictures of the composed video datastream with a collated video by referencing, via motion-compensated temporal prediction, the first portion of the composed video datastream, wherein the first portion is signaled to not to be output and the second portion is signaled to be output.

According to another embodiment, a system may have at least one of video encoder configured to provide at least one input video datastream; and an inventive video composition apparatus configured to compose a composed video datastream using the at least one input video datastream, the composed video datastream and the at least one input video datastream being encoded using motion-compensated temporal prediction.

According to another embodiment, a system may have a plurality of video encoders each configured to provide a respective one of a plurality of input video datastreams; and an inventive video composition apparatus configured to compose a composed video datastream out of the plurality of input video datastreams, the composed video datastream and the plurality of input video datastreams being encoded using motion-compensated temporal prediction.

According to another embodiment, a video composition method for composing a composed video datastream using at least one input video datastream, the composed video datastream and the at least one input video datastream being encoded using motion-compensated temporal prediction, may have the steps of: forming a sequence of inherited pictures of the composed video datastream with filling a spatial portion of the inherited pictures by collecting and copying motion-compensation side information and prediction residual data of the at least one input video datastream, wherein a spatial location of the spatial portion temporally changes from one inherited picture to the next in the sequence of inherited pictures, and inserting no-output pictures into the composed video datastream between the inherited pictures of the sequence of inherited pictures, the no-output pictures referencing, via motion-compensated temporal prediction, a subset of the inherited pictures.

According to another embodiment, a video composition method for composing a composed video datastream out of a plurality of input video datastreams, the composed video datastream and the plurality of input video datastreams being encoded using motion-compensated temporal prediction, may have the steps of: multiplexing the plurality of input video datastreams into a first portion of pictures of the composed video datastream by collecting and copying motion-compensation side information and prediction residual data of the plurality of input video datastreams into the first portion of the composed video datastream, and filling a second portion of the pictures of the composed video datastream with a collated video by referencing, via motion-compensated temporal prediction, the first portion of the composed video datastream, wherein the first portion is signaled to not to be output and the second portion is signaled to be output.

Another embodiment may have a hierarchically temporally coded video data stream encoded using motion-compensated temporal prediction and motion-compensation side information prediction, wherein the hierarchically temporally coded video data stream signals a picture-scope temporal hierarchy layer ID for each picture of the hierarchically temporally coded video data stream and includes high-level syntax with a beyond-picture-scope temporal hierarchy layer ID discriminator guaranteeing for one or more temporal hierarchy level IDs that pictures of the respective one or more temporal hierarchy level IDs are not referenced, via temporal motion-compensation side information prediction, by any other input picture.

Another embodiment may have a video data stream encoded using motion-compensated temporal prediction and motion-compensation side information prediction, wherein the video data stream distinguishes, by picture wise signaling, first pictures at which none of a current set of reference pictures is referenced, via temporal motion-compensation side information prediction, by any succeeding picture of the video data stream, and second pictures at which one of a current set of reference pictures is—or is candidate for being—referenced, via temporal motion-compensation side information prediction, by any succeeding picture of the video data stream.

Another embodiment may have a non-transitory digital storage medium having a computer program stored thereon to perform the video composition method for composing a composed video datastream using at least one input video datastream, the composed video datastream and the at least one input video datastream being encoded using motion-compensated temporal prediction, the video composition method having the steps of: forming a sequence of inherited pictures of the composed video datastream with filling a spatial portion of the inherited pictures by collecting and copying motion-compensation side information and prediction residual data of the at least one input video datastream, wherein a spatial location of the spatial portion temporally changes from one inherited picture to the next in the sequence of inherited pictures, and inserting no-output pictures into the composed video datastream between the inherited pictures of the sequence of inherited pictures, the no-output pictures referencing, via motion-compensated temporal prediction, a subset of the inherited pictures, when said computer program is run by a computer.

Another embodiment may have a non-transitory digital storage medium having a computer program stored thereon to perform the video composition method for composing a composed video datastream out of a plurality of input video datastreams, the composed video datastream and the plurality of input video datastreams being encoded using motion-compensated temporal prediction, the video composition method having the steps of: multiplexing the plurality of input video datastreams into a first portion of pictures of the composed video datastream by collecting and copying motion-compensation side information and prediction residual data of the plurality of input video datastreams into the first portion of the composed video datastream, and filling a second portion of the pictures of the composed video datastream with a collated video by referencing, via motion-compensated temporal prediction, the first portion of the composed video datastream, wherein the first portion is signaled to not to be output and the second portion is signaled to be output, when said computer program is run by a computer.

In accordance with a first aspect of the present application, a composed video data stream is composed using at least one input video data stream, wherein the composed video data stream and the at least one input video data stream are encoded using motion-compensated temporal prediction, and the video composition is performed by forming a sequence of inherited pictures of the composed video data stream with filling a spatial portion of the inherited pictures by collecting and copying motion-compensated side information and prediction residual data of the at least one input video data stream, wherein a spatial location of the spatial portion temporally changes from one inherited picture to the next in the sequence of inherited pictures, and inserting at least one no-output picture into the composed video data stream between the inherited pictures of the sequence of inherited pictures, the at least one no-output picture referencing, via motion-compensated temporal prediction, a subset of the inherited pictures. In accordance with this aspect, the temporal change of the spatial portion's spatial location is alleviated, in a computational complexity sense, by inserting the at least one no-output picture between the inherited pictures. Using same, the necessity to leave the compressed domain is avoided and "miss-referencing" between pictures of the at least one input video data stream may be avoided by way of the at least one no-output picture, using which it is feasible to "re-register" the pictures of the at least one input video data stream before and after the spatial locations change, respectively.

In accordance with a further aspect of the present application, a concept for composing a composed video data stream out of a plurality of input video data streams comprising multiplexing the plurality of input video data streams into a first portion of pictures of the composed video data stream by collecting and copying motion-compensation side information and prediction residual data of the plurality of input video data streams into the composed video data stream and filling a second portion of the pictures of the composed video data stream with a collated video by referencing, via motion-compensated temporal prediction, the first portion of the composed video data stream, wherein the first portion is signaled not to be output and the second portion is signaled to be output. In line with the first aspect's idea, the video composition according to the second aspect of the present application separates between a portion of the composed video data steam filled by collecting and copying, and another portion added synthetically by referencing, via motion-compensated temporal prediction, the other portion of the composed video data stream obtained by collecting and copying. In accordance with a second aspect, however, the second portion forms the actual collected video and is signaled to be output. The first portion simply represents a kind of reservoir of reference picture content on the basis of which the picture content may be composed selectively by referencing certain sub-portions of the first portion of the composed video data stream using motion-compensated temporal prediction. Thus, video composition thus performed on the basis of one or a plurality of input video data streams results in a composed video data stream which may be decoded by a standard video decoder which does not need to be able to rearrange an inbound video data stream over the presentation area of the video or does not need to be able to decode a plurality of input video data streams in parallel. Rather, the video composition assumes the task of transcoding, and this transcoding avoids leaving the compressed/encoded domain with regard to the one or plurality of input video data streams thereby keeping the computational efforts in reasonable amount.

BRIEF DESCRIPTION OF THE DRAWINGS

Embodiments of the present invention will be detailed subsequently referring to the appended drawings, in which:

FIG. 22 exemplarily describes respective signaling in the form of an SEI message; and FIG. 23 shows a typical system architecture for video mixing, here exemplarily shows for traffic video surveillance.

DETAILED DESCRIPTION OF THE INVENTION

Figure 1:
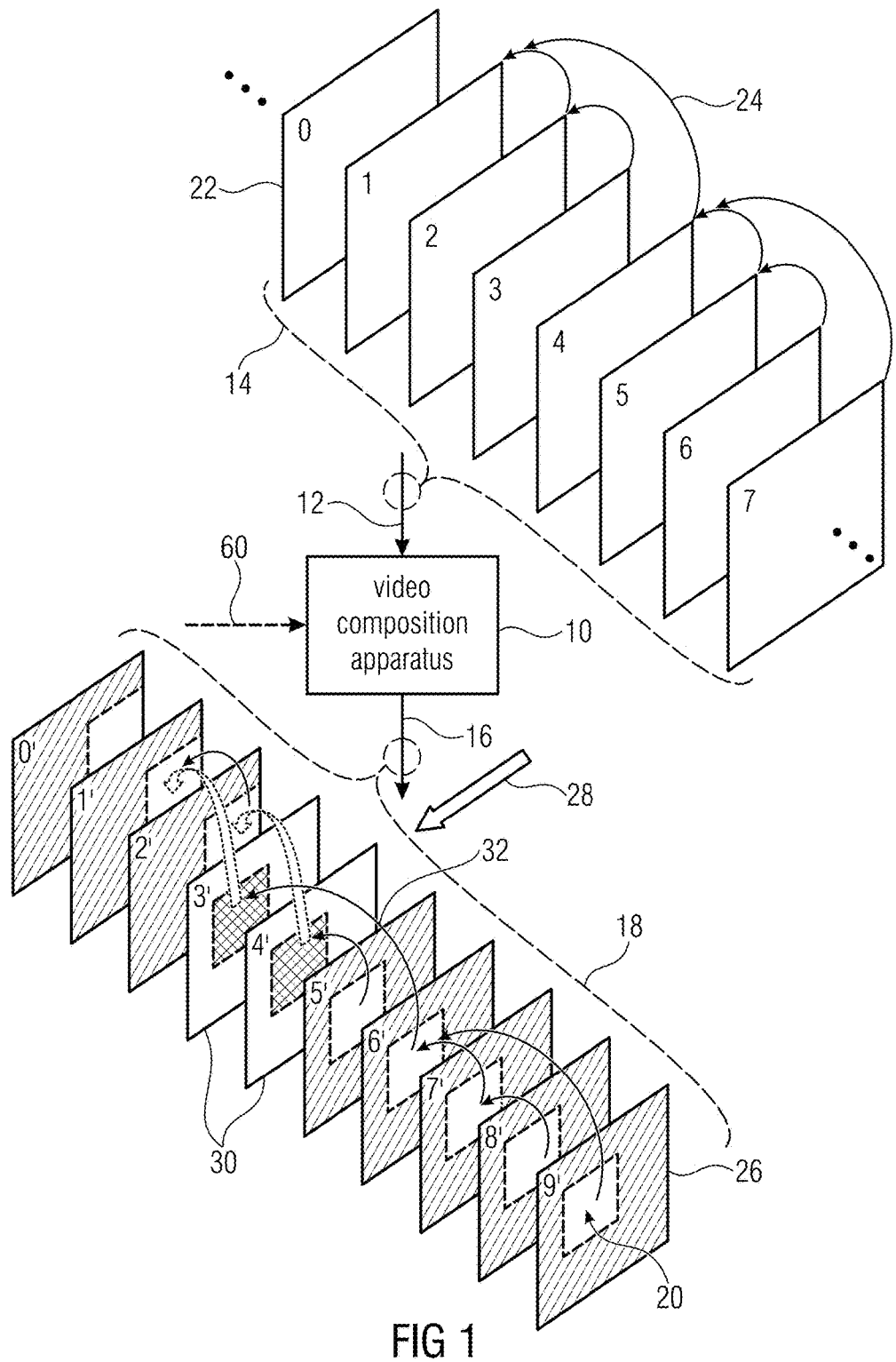
FIG. 1 shows a schematic block diagram of video composition apparatus along with a schematic representation of at least one input video data stream and the composed video data stream in accordance with an embodiment.

FIG. 1 shows a video composition apparatus according to one embodiment of the present application. The video composition apparatus of FIG. 1 performs the video composition in accordance with an aspect of the present application according to which no-output pictures are inserted into the composed video data stream, thereby allowing for a temporal change in a spatial location of a spatial portion, which is filled by collecting and copying motion-compensated side information and prediction residual data of a certain input video data, by insertion of no-output pictures which replace reference pictures displaying the spatial location of a spatial portion before the temporal change with reference pictures displaying the spatial location of a spatial portion after the temporal change in the decoded picture buffer of the decoder which decodes the composed video data stream.

The video composition apparatus of FIG. 1 is generally indicated using reference sign 10 and comprises an input 12 for receiving an input video data stream 14 and an output 16 for outputting a composed video data stream 18. The composed video data stream 18 and the input video data stream 14 are encoded using motion compensated temporal prediction. They may, for instance, be encoded using HEVC, VP9 or using some other video encoding scheme. As will be outlined in more detail below, the video composition apparatus 10 is able to generate or compose the composed video data stream 18 with low computational effort and remaining within the compressed/encoded domain as far as input video data stream 14 is concerned.

In a manner outlined in more detail below, the video composition apparatus of FIG. 1 is able to generate the composed video data stream 18 such that upon decoding the composed video data stream, the video represented by the input video data stream 14 is displayed at a spatial portion 20, which temporally changes its spatial location within the composed video data stream's 18 pictures. For example, pictures of the input video data stream 14 are of a first size, such as n×m samples wide, while the pictures of the composed video data stream 18 are of a second size greater than the first size, such as N×M samples wide, with n<N and/or m<M with n<N and m<M being illustrated in FIG. 1. The spatial portion 20 within which the content of the input video data stream 14 is, in accordance with the example of FIG. 1, of the first size, i.e. n×m wide, although the example of FIG. 1 may be modified in that the video composition apparatus 10 depicts within the spatial portion 20 of the composed video data stream 18 merely a certain stationary spatial sub-part of the input video data stream 14.

In order to ease the understanding of the mode of operation of the video composition apparatus 10 of FIG. 1, FIG. 1 shows an exemplary portion of the sequence of pictures 22 of the input video data stream 14. The pictures 22 exemplarily shown in FIG. 1 are numbered from 0 to 7 in accordance with their coding order in data stream 14 and using continuous-line arrows 24. FIG. 1 illustrates the interdependencies among the pictures 22 by way of the motion-compensated temporal prediction, i.e. which picture 22 references which picture via motion-compensated temporal prediction. That is, any picture 22 to which an arrow 24 points, represents a reference picture of the picture from which the respective arrow starts. Picture 22 with number 1, for example, represents a reference picture of the pictures 22 with numbers 2 and 4. The motion-compensated temporal prediction is controlled within the input video data stream 14 by respective motion-compensation side information in addition to which the input video data stream 14 comprises prediction residual data for correcting the prediction by way of the motion-compensated temporal prediction. For example, the motion-compensated side information may comprise motion vectors for blocks of the respective referencing picture, and the prediction residual data may also be block-wise encoded using, for example, transform coding, using for example a spectral decomposition transform, such a DCT or the like, so that the prediction residual data may, for example, comprise transform coefficients. Motion-compensation side information and prediction residual data present in the input video data stream 14 for each picture 22 may be present in the data stream in, for example, an entropy encoded form using, for example, variable length coding and/or arithmetic coding. In particular, the motion-compensation side information and prediction residual data for a certain picture 22 may be present in data stream 14 in the form of one or more packets of slices into which each picture 22 may be spatially subdivided along for example some coding order traversing the respective picture 22.

As far as a composed video data stream 18 is concerned, FIG. 1 illustrates a fragment of a sequence of pictures 26 out of this composed video data stream 18 within which the temporally corresponding portion of the input video data stream 14 is displayed made up of pictures 22 with numbers 0 to 7 shown in FIG. 1. For illustration purposes, FIG. 1 shows that the video composition apparatus 10 changes once during that time the spatial portion 20, within which the content of video data stream 14 is displayed, in terms of its spatial location, but it should be noted that video composition apparatus 10 is not restricted to temporally changing the spatial location of spatial portion 20 merely once, neither relating to the whole composed video data stream 18 nor any subsequence thereof.

In order to avoid the briefly outlined problems above in changing the spatial location of spatial portion 20 within the pictures 26 of data stream 18, the video composition apparatus 10 acts as follows.

Before the change in the spatial location of spatial portion 20, which time instant is illustratively indicated using arrow 28 in FIG. 1, the video composition apparatus 10 forms the pictures 26 of the composed video data stream 18 simply by inheriting data from corresponding pictures 22 of the input video data stream 14. To be more precise, in the example of FIG. 1 the first three pictures 22 shown in FIG. 1 of the input video data stream 14 are prior to the change 28 in the spectral portion's 20 spatial location, and accordingly the first three pictures of the composed video data stream 18 are "inherited pictures", the spectral portion 20 of which is filled by the video composition apparatus 10 by collecting and copying motion-compensation side information and prediction residual data of input video data stream 14. To be more precise, the spatial portion 20 of the picture 26 with number 0' in the composed video data stream 18 is filled, for example, by collecting and copying the motion-compensation side information and prediction residual data of the corresponding picture 22 of video 14 having number 0, and likewise, the spatial portion 20 of picture 26 with number 1' is filled by collecting and copying motion-compensation side information and prediction residual data of the corresponding picture 22 with number 1 and the spatial portion 20 of picture 26 with number 2' is filled accordingly using the respective data of picture 22 with number 2. That is, the spatial portion 20 of each inherited pictures 26 is filled using an associated one of the pictures 22 with maintaining the picture order of pictures 22.

Pictures 26 of the composed video data stream 18, the spatial portion 20 of which is thus filled by collecting and copying respective data of corresponding pictures 22 of the input video data stream 14, are, as just described, called "inherited pictures" and are indicated in FIG. 1 using simple hatching within the area of pictures 26 outside spatial portion 20. The area surrounding the spatial portion 20 may be filled by video composition apparatus 10 artificially, for example, may simply be black or may show some other still picture or the like. In video composition apparatus 10 it would also be feasible to show within the surrounding/remainder area of pictures 26 outside spatial portion 20 another video represented by another input video data stream. The embodiments described further below represent an example for such extension of the video composition apparatus 10. As described there, more than one input data stream with associated spatial portions in the composed video data stream's pictures may be handled in parallel. The spatial portions of the input data streams may, for example, mutually change their position at time instant 28. For further details, reference is made to the description brought forward below.

The video composition apparatus 10 proceeds with forming the sequence of inherited pictures 26 subsequent to the spatial portion's 20 change in spatial location within pictures 26. Accordingly, a picture 26 with number 5' is an inherited picture, the spatial portion 20 of which is spatially displaced relative to the spatial portions 20 of aforementioned pictures 26 with numbers 0' to 2' and the spatial portion 20 thereof is filled by collecting and copying motion-compensation side information and prediction residual data of picture 22 with number 3 of the input video data stream 14, wherein the subsequent pictures 26 with the following numbers 6' to 9' of the composed video data stream 18 are filled within the spatial portion 20 likewise by way of collecting and copying respective data of the subsequent pictures 22 with numbers 4 to 7 of the input video data stream 14.

Thus, pictures 26 with numbers 0', 1', 2', 5' to 9' form a sequence of inherited pictures filled, as described, using collection and copying of respective motion-compensation side information and prediction residual data of corresponding pictures 22 of the input video data stream 14 and otherwise filling the outside area other than the spatial portion 20. Due to the change 28 in the spatial portion's 20 spatial location, however, the content of the composed video data stream 18 within the spatial portion 20 would be incorrect in the absence of any further measures subsequent to the time instance 28 due to the shift or displacement of the spatial portion 20 at time instant 28. For example, see picture 26 with number 5': since this picture 26 is filled within spatial portion 20 by collecting and copying respective motion-compensation side information and prediction residual data of the corresponding picture 22 with number 3 it refers, via motion-compensated temporal prediction, to the immediately preceding picture which would, in the absence of any further measure, be the preceding inherited picture 2'. However, the latter picture 26 has the picture content inherited from the reference picture of picture 22 with number 3, namely picture 22 with number 2, inserted at a displaced location, and accordingly the video composition apparatus 10 fixes this problem in the following manner.

In particular, the video composition apparatus 10 of FIG. 1 inserts no-output pictures 30 into the composed video data stream 18 between the inherited pictures 26, wherein the no-output pictures 30 reference, via motion-compensated temporal prediction, a subset of the inherited pictures.

In order to illustrate the way the no-output pictures overcome the just outlined problem of miss-referencing, FIG. 1 illustrates the inter-dependencies between the pictures 26 and 30 of the composed video data stream 18 as resulting from the collected and copied motion-compensation side information using continuous-line arrows 32, while the interdependencies added by way of no-output pictures 30 and their motion-compensation side information artificially generated by video composition apparatus 10 in a manner described in more detail below is illustrated using dashed arrows 34. As can be seen, the video composition apparatus 10 has inserted the no-output pictures 30 at the time instant 38, at which the spatial portion 20 has spatially changed its spatial location. The "problematic" picture 26 previously discussed was, for example, picture 5'. The latter referred to the immediately preceding picture of data stream 18 which, however, is now a no-output picture 30 with number 4'. As can be seen, video composition apparatus 10 fills the spatial portion 20 of no-output picture 30 such that 1) the spatial portion 20 of no-output picture 30 is positioned at the spatial portion's 20 new location co-located to the spatial portion 20 of picture 5', and such that 2) the area of spatial portion 20 of no-output picture 30 with number 4' is filled, via motion-compensated prediction, by copying the content of the spatial portion 20 of inherited picture 2'. The latter inherited picture, namely picture 2' is, in turn, the reference picture of picture 5'—if the no-output pictures 30 would not have been inserted into data stream 18. In other words, the no-output picture 30 with number 4' copies the content of the spatial portion 20 of inherited picture 2' into the spatial portion's 20 new location as valid subsequent to change time instant 28, and thus assumes, as far as its spatial portion 20 is concerned, the role of picture 2 as far as picture's 2 role as reference picture with respect to picture 3 is concerned. To be more precise, the no-output picture 4' is the reference picture of picture 5' just as picture 2' was the reference picture of picture 3 using the motion-compensated side information and prediction residual information data of which the spatial portion 20 of inherited picture 5' is filled. Now, the reference picture content for the spatial portion 20 of inherited picture 5' is at the correct position: it is within the immediately preceding picture or data stream 18, namely the no-output picture with number 4', and it is at the correct spatial location, i.e. at the location exactly spatially corresponding to the spatial portion 20 of picture 5'.

As is shown in FIG. 1, the video composition apparatus 10 also inserts a no-output picture 30 at the position of time instant 28, which substitutes the erstwhile inherited reference picture 1': that is, video composition apparatus 10 fills the no-output picture 30 at the spatial portion 20 co-located to the spatial portion 20 of the inherited pictures 26 succeeding time instant 28 with motion compensation side information which references, and thereby copies, the picture content of inherited picture 1' within its spatial portion 20. By this measure, this no-output picture 30, namely picture 3', serves correctly as reference picture for inherited picture 6' in that it is filled within spatial portion 20 with a picture content of picture 22 with reference number 1, which was the erstwhile reference picture of picture 4 using the motion-compensated side information and prediction residual data of which the spatial portion 20 of inherited picture 6' is filled. In other words, video composition apparatus 10 of FIG. 1 inserts as many no-output pictures 30 at time instant 28 as there are reference pictures among pictures 22 within input video data stream 14 preceding time instant 28, which are reference pictures for pictures 22 of input video data stream 14 succeeding time instant 28. In even other words, video composition apparatus 10 inserts at time instant 28 as many no output pictures 30 as there are inherited pictures 26 within data stream 18, which would, without insertion, represent reference pictures for inherited pictures 26 of data stream 18 succeeding time instant 28.

The video composition apparatus 10 could, in performing the collecting and copying of the motion-compensation side information and prediction residual data of pictures 22 of the input video data stream 14 preliminarily return from, for example, the entropy encoded domain to the syntax level domain, i.e. perform entropy decoding of the motion-compensation side information and prediction residual data of pictures 22 of the input video data stream 14 in order to obtain syntax elements describing the motion-compensation side information and prediction residual data of pictures 22, with using the thus collected and copied motion-compensation side information and prediction residual data so as to fill the respective inherited picture 26 within spatial potion 20, with performing entropy encoding the same in order to form the composed video data stream. The motion-compensation side information and prediction residual data of pictures 22 of the input video data stream 14 could, by this measure, even be spatially re-sorted or be re-ordered in order to take into account, for example, a different coding order in traversing the spatial portion 20 in the inherited picture 26 compared to the coding order using which the respective picture 22 is coded. However, although this way of performing the collection and copying avoids the necessity for the video composition apparatus 10 to perform the motion-compensation search again, even the entropy decoding/encoding detour via the syntax element level may be avoided by video composition apparatus 10 in accordance with an embodiment. In other words, the collecting and copying may be performed in a manner remaining in the entropy coded domain. In order to illustrate this possibility, reference is made to FIG. 2.

Figure 2:
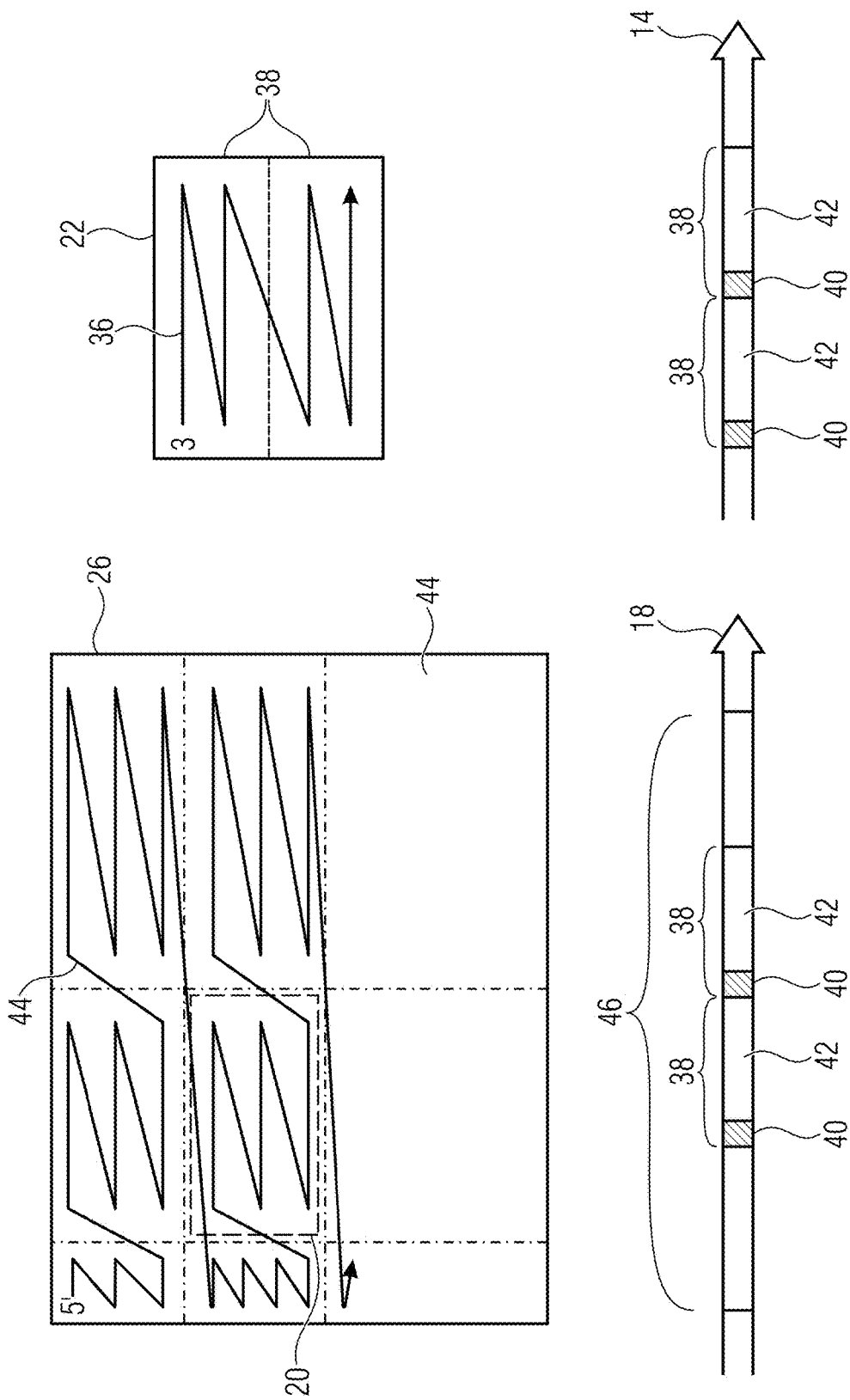
FIG. 2 shows a schematic diagram of an inherited picture along with the picture of the inbound video data stream in order to illustrate the process of filling the spatial portion of the inherited picture by collecting and copying motion-compensation side information and prediction residual data of the picture of the input video data stream in accordance with an embodiment.

FIG. 2 representatively illustrates inherited picture 5' and the corresponding input picture 22 with number 3, the motion-compensation side information and prediction residual data of which is used to fill, by collection and copying, the spatial portion 20 of picture 5'. FIG. 2 also illustrates the way picture 22 with number 3 is represented in data stream 14: following a predetermined coding order, such as a raster scan order 36, the content of picture 22 is sequentially coded into data stream 14 in units of one or more slices 38. Two slices are exemplarily illustrated in FIG. 2. Each slice 38 comprises, for example, within data stream 14 a slice header 40 indicating, for example, the respective slices positioned within picture 22 indicated, for example, relative to the upper left hand corner of picture 22.

In order to be able to inherit slices 38 into the composed video data stream 18 substantially as they are without leaving the entropy coding domain at least as far as their payload section 42 is concerned, which comprises, encoded using entropy coding, the motion-compensation side information and prediction residual data, so as to code the content of picture 26 as far as spatial portion 20 is concerned, the video composition apparatus subdivides picture 26 in accordance with the embodiment of FIG. 2 into tiles 44, the tile partitioning being illustrated in FIG. 2 using dash-dot lines and being available, for example, in HEVC. By subdividing picture 26 into tiles 44, the coding order, using which picture 26 is coded in data stream 18, is guided so that within spatial portion 20 of picture 26 the coding order coincides with the coding order 36 using which picture 22 is coded into slices 38. To be more precise, as described above picture 26 is larger than picture 22. Spatial portion 20 is of the same size as picture 22. The tile partitioning of picture 26 into tiles 44 is made such that spatial portion 20 exactly coincides with one of tiles 44. The coding order of picture 26 is modified by the tile partitioning as the coding order 44 of picture 26 traverses the tiles 44 in accordance with a tile order with traversing the picture 26 within one tile first before proceeding with the next tile in tile order. By this measure, it is feasible that video composition apparatus 10 directly copies slices 38 into data stream 18, namely into the access unit 46 into which picture 26 is coded in data stream 18. These slices 38 then code the respective tile 44 representing spatial portion 20.

It may be that the video composition apparatus 10, in using/applying the concept of FIG. 2, modifies some data within slice header 40. For example, each slice header 40 may comprise a slice address indicating the respective slice's start position (encoding order 36) relative to the upper left hand corner of the respective picture. Accordingly, in order to account for the slice's new position within the inherited picture 26, namely within spatial portion 20, video composition apparatus 10 may change the slice address to measure the slice's new position within spatial portion 20 relative to the upper left hand corner of inherited picture 26.

Additionally or alternatively, each slice header 40 may comprise a picture order count data. The picture order count may order the pictures within the respective data stream. As indicated above, as video composition apparatus 10 inserts no-output pictures 30 into composed video data stream 18, video composition apparatus 10 may change such picture order count data in the slice header 40 when filling the spatial portion 20 of the inherited pictures 26. For example, the slice header 40 of FIG. 2 may indicate 3 as picture order count, while the slice header of slices 38 within data stream 18 may indicate 5 in order to account for the insertion of the two no-output pictures 30.

Additionally or alternatively, the slice header 40 may comprise reference picture order count difference values, i.e. values indicating the reference picture of the current picture 22 in a relative sense, i.e. the x-th picture preceding or succeeding the current picture 22. In the embodiment described with respect to FIG. 1, a change of a reference picture order count difference value would not be necessitated, as the no-output pictures 30 were positioned at the correct position within the video data stream 18, but in accordance with another example, video composition apparatus 10 may change such reference picture order count difference values within slice headers 40.

Further, and also additionally or alternatively, slice header 40 may comprise a reference to a set of reference picture order count difference values. Such referencing could, for example, refer to a parameter set conveyed within input video data stream 14 and the referencing could be changed in the slice header 40 in filling the spatial portion 20 using the slices 38. Likewise, the parameter sets themselves could be adopted from the input video data stream without modification or with modifying them.

Additionally, it could be feasible that additionally or alternatively slice header 40 comprises a differential coded quantization parameter. That is, within data stream 14, for example, the differential coded quantization parameter of a slice header 40 could be differential coded relative to a quantization parameter conveyed within data stream 40 for picture 22 or even for a sequence of pictures including picture 22. In constructing the composed video data stream 18, the video composition apparatus 10 may likewise choose a certain quantization parameter for picture 26 or even a sequence of pictures including picture 26 within data stream 18 and it could for example be different to the quantization parameter serving as a basis of the differential coded quantization parameter within slice header 40. Accordingly, the slice header 40 of slices 38 as transferred into data stream 18 could be varied by video composition apparatus 10 in order to account for the change in the reference quantization parameters signaled elsewhere in data stream 18 by apparatus 10.

Figure 3:
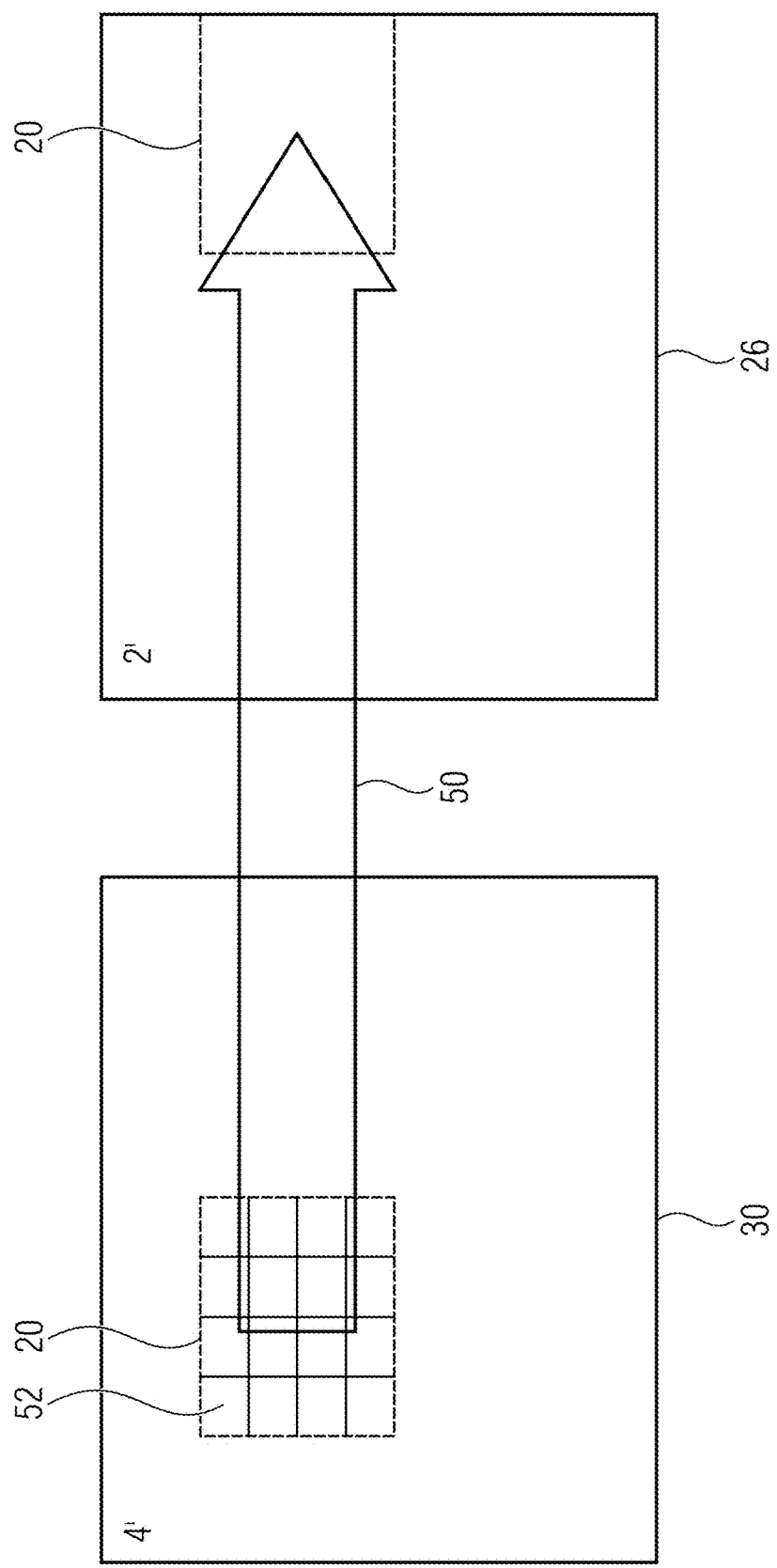
FIG. 3 shows a schematic diagram illustrating an inserted no-output picture along with the inherited picture carrying within its spatial portion the reference picture, the no-output picture substitutes and the composed video data stream in order to illustrate possibilities in constructing/coding the spatial portion of the no-output picture in accordance with embodiments of the present application.

FIG. 3 illustrates a possibility of how video composition apparatus 10 could artificially generate the no-output pictures. In particular, FIG. 3 representatively shows no-output picture 30 having number 4' and the inherited picture 26 having number 2', i.e. the inherited picture 26 which no-output picture 30 substitutes and references via motion-compensated temporal prediction. In particular, FIG. 3 illustrates the case where data streams 14 and 18 are encoded using motion-compensated temporal prediction in a block-based manner. That is, the respective pictures are partitioned into blocks, some of which are predicted using motion-compensated temporal prediction, and for each of these blocks an own motion vector is indicated by the motion-compensation side information. Apparatus 10 determines the motion-compensation side information for the spatial portion 20 of no-output picture 30 such that the portion 20 of no-output picture 30 is, by translation, copied from spatial portion 20 of inherited picture 26 with both portions 20 being of the same size. That is, each sample of portion 20 of no-output picture 30 is copied from a corresponding sample within picture 26 displaced using one and the same motion vector 50 relative to the location with picture 26 co-located to the respective sample of portion 20 of no-output picture 30. However, as motion vector 50 is the same for all blocks 52, in accordance with an embodiment, apparatus 10 exploits a spatial prediction mechanism in order to code the motion-compensation side information for portion 20 of no output picture 30 if available by the encoding scheme underlying data streams 14 and 18. In that case, for example, motion vector 50 would be explicitly coded within data stream 18 merely for one of blocks 52 of spatial portion 20 of no-output picture 30, while for other blocks 52 of portion 20, the motion vector would be adopted/predicted by way of spatial prediction. For example, a skip mode may be used for blocks 52 other than the one for which the motion vector 50 is explicitly coded. Using the skip mode, for example, would signal for each block 52 that a motion vector 52 is adopted or spatially predicted, and that no prediction residual data is present for the respective block 52. Prediction residual data is not coded by apparatus 10 for no spatial portion 20 of any no-output picture 30, for example, in order to copy the picture content of spatial portion 20 of inherited picture 26, which the no-output picture 30 substitutes, unmodified.

Briefly referring back to FIG. 1, FIG. 1 illustrates the possibility that the video composition apparatus 10 of FIG. 1 could be configured to control the temporal change of the spatial location of the spatial portion 20 responsive to an external signal 60, i.e. external requests for a change. If so, the video composition apparatus 10 may not execute such an external request for a change immediately and unambiguously. Rather, video composition apparatus 10 could, upon receiving a request 60, inspect sequentially the input pictures 22 in order to determine the first one of the same which is not referenced, via temporal motion-compensation side information prediction, by any other input picture 22. The details and the reasons for doing so are set out below in more detail.

Figure 4:
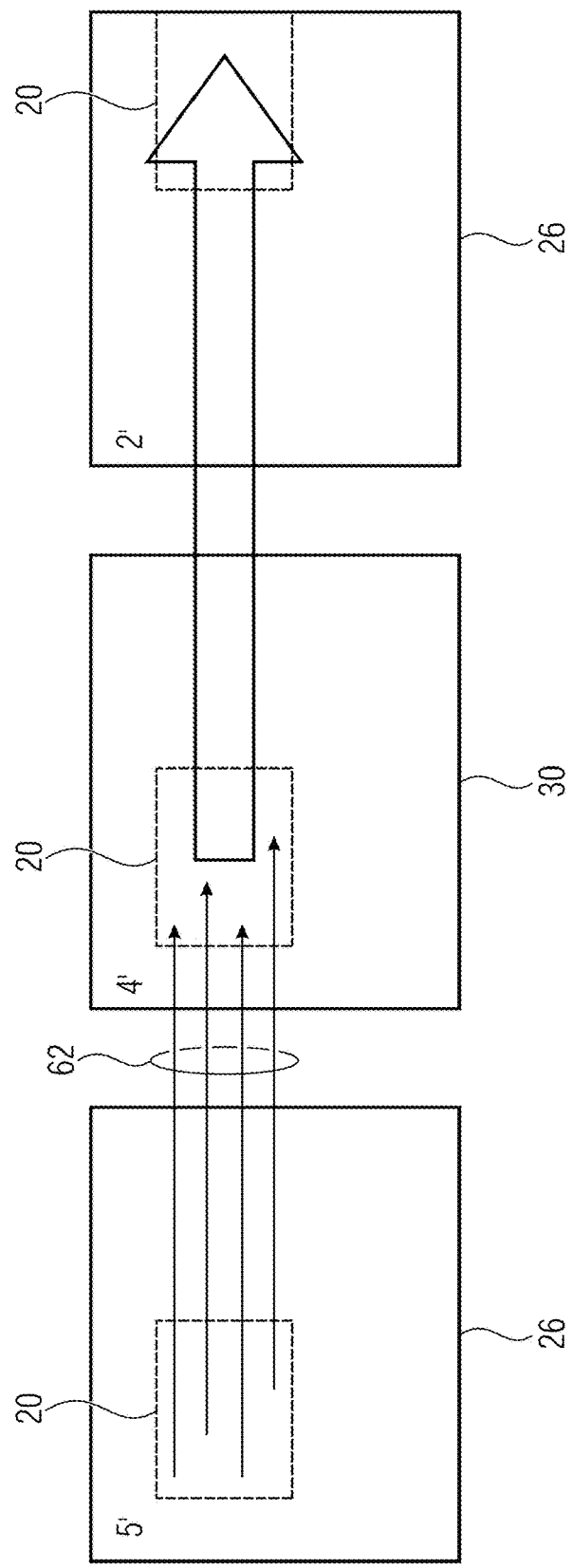
FIG. 4 shows a schematic diagram of an inherited picture referencing, from its spatial portion, via the detour of a no-output picture of the composed video data stream, the spatial portion of the erstwhile reference picture.

For example, see FIG. 4. FIG. 4 illustrates the substitution of picture 2' by no-output picture 4' with respect to picture 5'. That is, the no-output picture 4' having been inserted by apparatus 10 copies the picture content of the position of spatial portion 20 valid before the change of the spatial portions location so as to be inserted in the no-output picture 4' at the spatial portion's 20 new location so that picture 5', the spatial portion 20 of which has been filled by collection and copying from one of the input pictures, namely input picture 3, is able to predict the picture content within spatial portion 20 using the motion-compensation side information of input picture 3, illustrated using several arrows 62 in FIG. 4, from the co-located spatial portion 20 of no-output picture 4'. In other words, the motion-compensation side information collected and copied from input picture 3 into spatial portion 20 of picture 5' may, for example, code one motion-vector per inter-predicted block within spatial portion 20.

As explained with respect to FIG. 3, temporal prediction might be one option in order to reduce the bitrate to be spent for the motion-compensation side information, such as the motion-compensation side information of the input pictures 22. However, temporally predicting the motion-compensation side information of spatial portion 20 of picture 5' from the reference picture would, at present, lead to errors due to the following reason: the no-output picture 4' substitutes picture 2' with respect to the latter's function as reference picture for picture 5'. This works with respect to the picture content, i.e. the finally reconstructed picture content which is copied into the spatial portion 20 of picture 5' by way of the motion-compensation side information 62. However, as became clear from the description of FIG. 3, the motion-compensation side information conveyed in the data stream for spatial picture 20 of no-output picture 4' does not coincide with the motion-compensation side information signaled for spatial portion 20 of picture 2' as the motion compensation side information of spatial portion 20 of no-output picture 4' merely, in a translatory manner, copies the spatial portion 20 of picture 2' into the spatial portion 20 of no-output picture 4'. In other words, the motion vectors of spatial portion 20 of no-output portion 4' are merely artificial motion vectors uniform among the whole spatial portion 20 while the motion vectors signaled for spatial portion 20 of picture 2' represent the picture contents' movement in the video scene.

Accordingly, in accordance with an embodiment of the present application, the video composition apparatus 10 is configured to execute an external request 60 for a change not directly but upon encountering a sequentially next occasion or time instant at which the replacement of reference pictures among past—relative to that occasion or time instant—inherited pictures may not lead to wrong temporal motion-compensation side information prediction, by any subsequent—relative to that occasion or time instant—input picture 22. Imagine, for example, the request 60 would have arrived at apparatus 10 at a time where the spatial portion 20 of picture 1' is to be filled by collecting and copying the respective data of input picture 1 in FIG. 1. The apparatus 10 would have checked whether any of the currently available reference pictures, i.e. any of the reference pictures which would be candidates for being replaced by respective no-output pictures if the time instant 28 was right in front of picture 1—are used for temporal prediction for predicting the motion-compensation side information. If so, apparatus would have deferred the execution of the change of the spatial location of spatial portion 20. Then, the apparatus 10 would have likewise checked input picture 2, for example. That is, apparatus would have checked whether the reference pictures at that time instant, i.e. the candidates to be replaced by no-output pictures, are referenced for motion-compensation side information. In the case of FIG. 1, for example, picture 3 might have been the first input picture 22 from which on no picture uses temporal prediction for predicting the motion-compensation side information from any of the reference pictures to be replaced at that time, i.e. all then available reference pictures are not used for temporal prediction of motion-compensation side information and accordingly apparatus 10 executed requests 60 between pictures 2 and 3 of the input pictures 22.

One way to efficiently signal to the video composition apparatus 10 possible points in time where a request 60 may be executed, i.e. an efficient way of detecting input pictures at which a request 60 may be executed by inserting before the respective picture no-output pictures 30, is to generate video 14 such that pictures of one or more certain temporal hierarchal layer(s) is/are guaranteed to not to be used for temporal prediction of motion-compensation side information. That is, while pictures 22 of a certain temporal layer ID(s) such as of ones exceeding a certain threshold temporal hierarchy layer ID, are allowed to be referenced, via temporal prediction for motion-compensation side information, from other pictures 22 of the data stream 14, the data stream 14 may signal to the video composition apparatus 10 that pictures 22 of a temporal hierarchy layer ID other than the one or more certain temporal layer ID(s), such as above ones succeeding that threshold are guaranteed to not be used as a reference in temporal prediction of motion-compensation side information. In that case, apparatus 10 may detect encountering a sequentially next one within the sequence of input pictures 22—from the time of arrival of the request 60 on—at the coding time of which none of the one or more current reference pictures which were to be replaced by no-output pictures if that coding time turned out to be a suitable switching time instant 28—is of a temporal layer ID containing pictures allowed to be referenced for motion-compensation side information.

The apparatus could perform this check merely on the basis of a picture-scope temporal hierarchy layer ID of the input pictures and a beyond-picture-scope temporal hierarchy layer discriminator comprised by high-level syntax of the inbound data stream 14. The picture-scope temporal hierarchy layer ID of the input picture 22 may for instance be contained in an access unit header associated individually with each picture 22, or within the slice header 40 of the slices of the respective input picture 22. The high-level syntax comprising the mentioned beyond-picture-scope temporal hierarchy layer discriminator may be comprised in an SEI message of data stream 14 as will be outlined hereinafter with respect to a concrete SEI message syntax example. Alternatively, apparatus 10 may detect the complete absence of temporal motion-compensation side information prediction in the data stream 14 (associated with a loss in coding efficiency) through respective high-level syntax and thus execute request 60 independent of a picture-scope temporal hierarchy layer ID. Even alternatively, inbound data stream 14 may comprise indicators, e.g. in the form of an SEI message or a special NAL unit type, that indicate suitability of the current picture for execution of request 60 by position of the indicator within the bitstream. Even alternatively, the apparatus 10 may, by default, expect the complete absence of temporal motion-compensation side information prediction in the data stream 14 without explicitly verifying the fact. The input video data streams would be provided to the apparatus 10 accordingly, i.e. obeying the respective constraints.

With regard to the artificially inserted no-output pictures 30 it is noted that, in order to reduce the data rate for the same, the apparatus could use temporal prediction of motion-compensation side information between one no-output picture 30 and another such as between different ones inserted at one certain time instant 28 or even between ones inserted at different time instants. By this measure, even the coding overhead for coding the one explicitly coded motion vector forming the seed for spatial motion-compensation side information prediction for the other blocks in the no-output picture's spatial portion is reduced since merely the residual of the temporal prediction of the same is coded.

Figure 5:
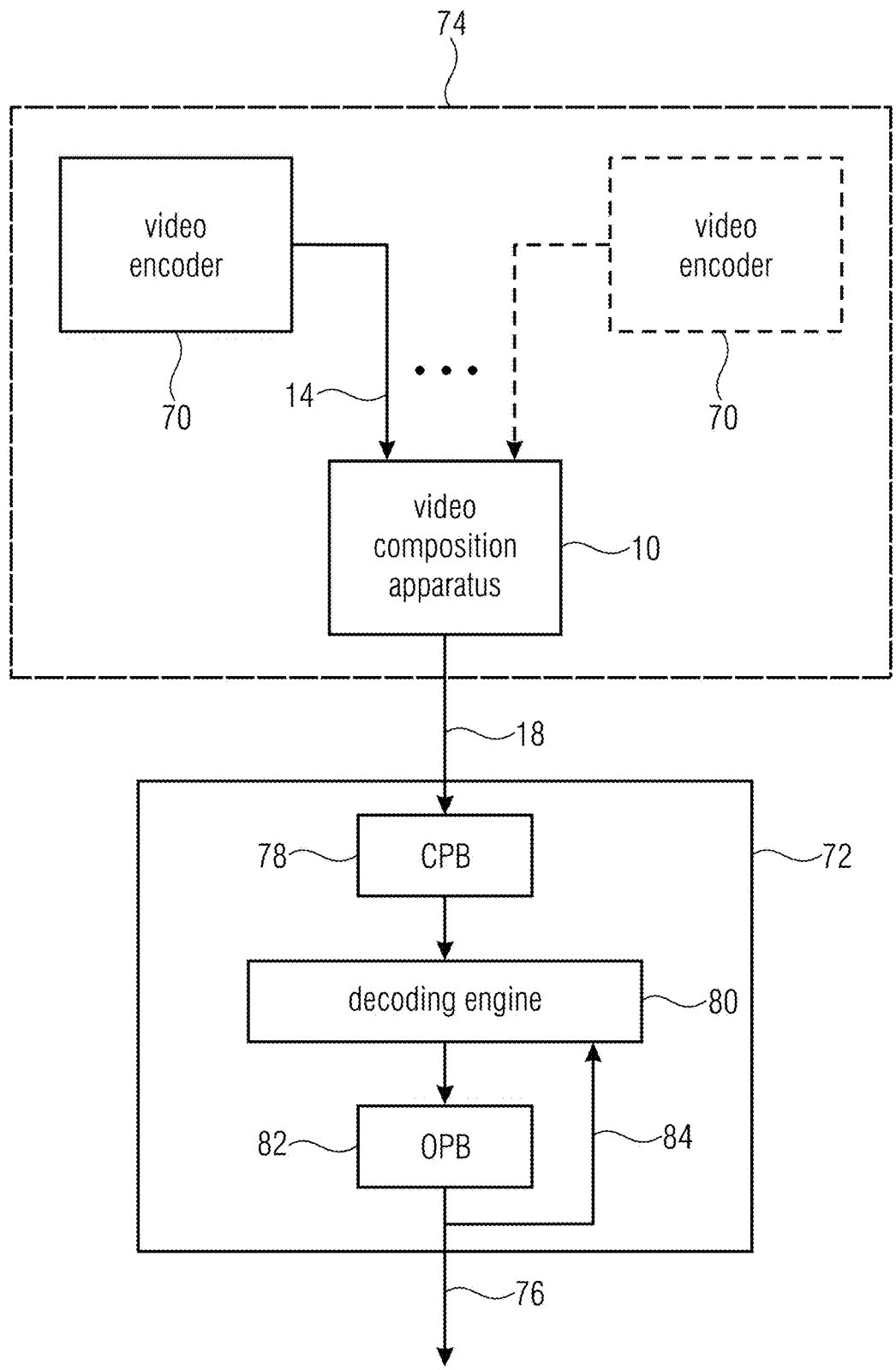
FIG. 5 shows a schematic diagram of a system using the video composition apparatus and further comprising one or more video encoders 70, the system being illustrated as outputting the composed video data stream to a decoder.

FIG. 5 illustrates video composition apparatus 10 in a framework together with a video encoder 70 and a decoder 72 which receives the composed video data stream 16. Here, the video composition apparatus 10 forms along with the video encoder 70 a system 74, examples of which are presented below with respect to embodiments using more than one video encoder 70 such as, for example, a traffic surveillance system providing one or more clients with blends of available traffic camera views, a virtual reality system realizing a panorama video application providing one or more clients with a sub-portion of a panorama video, or a telephone conferencing system providing one or more clients with a blend of view of third-party participants.

The video composition apparatus 10 receives the input video data stream 14 from video encoder 70 and displays same in the spatial portion 20 of the pictures of the composed video data stream 16 in the manner outlined above. The video decoder 72 merely needs to decode the input composed video data stream 16 as output by apparatus 10. At the decoder's 72 output, the reconstructed picture sequence to be displayed is output, indicated using reference sign 76 in FIG. 5. Internally, the decoder 72 is exemplarily indicated as being composed of a sequence of a coded picture buffer 78, following by a decoding engine 80 again followed by a decoded picture buffer 82. The inbound composed video data stream 18 enters buffer 78. The decoding engine 80 sequentially decodes the pictures 26 and 30 of data stream 18 and inserts the result of the decoding of these pictures into the decoding picture buffer 82. As indicated by an arrow 84, the output of the decoding picture buffer 82 is also fed back to the decoding engine 80 so that decoded pictures in buffer 82 may serve as reference pictures for subsequently decoded pictures as already outlined above with respect to motion-compensated temporal prediction.

In outputting decoded pictures, decoder 72 distinguishes between inherited picture 26 on the one hand and inserted no-output pictures 30 on the other hand: no-output pictures 30 are signaled in the data stream 18 as ones not to be output, i.e. not to be part of the video 76 to be displayed. For example, the data stream 18 could comprise, for each picture 26 and 30 of data stream 18, a flag signaling whether the respective picture is to be output or not. However, the flag could also be signaled on a slice by slice basis. That is, all slices belonging to a no-output picture 30 would signal the respective picture content to be not displayed. In HEVC, for example, the flag pic_output_flag could be used to this end. It should be noted that the pictures of the input video data streams could be all of the output picture type, but alternatively, it could be same are already interspersed by no-output pictures.

Although not specifically outlined above, the video encoder 70 could be configured to obey some coding constraints in addition to constraints imposed by the video codec itself. For example, in filling the spatial portion 20 of inherited pictures 26 on the basis of respective data of input pictures 22, it becomes clear that erstwhile picture borders of input pictures 22 become an internal boundary of spatial portion 20 after filling spatial portion 20. This situation change may, however, change the temporal motion-compensated prediction: motion vectors pointing to areas of reference pictures extending beyond a picture boundary may invoke some special treatment of the part of the copied area of the reference picture lying external to the reference picture such as extrapolation or the like. However, such invoking may not happen at the spatial portion's 20 boundary as the latter boundary may, for example, lie within respective inherited picture 26. Accordingly, video encoder 70 may restrict the motion-compensation side information nearby the picture's 22 borders to the extent that the motion-compensation side information does not copy reference pictures at areas extending beyond the picture's 22 borders. Additionally, the video encoder 70 could be constrained to avoid sub-pixel interpolation necessitated for motion vectors with sub-pixel precision close to the input picture's 22 borders. For example, motion vectors with sub-pixel precision of blocks within input picture's 22 area may invoke a finite impulse response filter procedure for interpolation of luma or chroma sample values. When the motion vector sub-pixel position is spatially close to input picture's 22 spatial picture border, the filter kernel may overlap with areas extending beyond the picture's 22 borders in interpolating the sub-pixel sample values. In such a case, the before mentioned special picture border treatment such as extrapolation or the like may be invoked. Filling the spatial portion 20 of inherited pictures 26 on the basis of respective data of input pictures 22, picture borders of input pictures 22 may become internal boundaries of spatial portion 20 of inherited pictures 26 after filling spatial portion 20 and such invoking may not happen. Accordingly, video encoder 70 may restrict the use of sub-pixel precision motion vectors nearby the picture's 22 borders to the extent that the sub-pixel interpolation process does not use reference pictures areas extending beyond the picture's 22 borders. Additionally, encoder 70 may, when performing temporal prediction of motion-compensation side information for blocks spatially located at the input picture's 22 spatial borders, facilitate motion vectors of blocks neighboring the collocated blocks within reference pictures if such blocks exists. As pointed out before, the filling of spatial portion 20 of inherited pictures 26 on the basis of respective data of input pictures 22 may turn input pictures 22 picture border into internal boundaries of spatial portion 20 of inherited pictures 26. Therefore, the temporal prediction process of motion vector side information of a given block spatially close to the internal boundary of portion 20 may access blocks within reference pictures neighboring the respective collocated blocks and therefore may access blocks that where not available to encoder 70 leading to a prediction mismatch. Accordingly, video encoder 70 may restrict the temporal prediction of motion-compensation side information nearby the picture's 22 borders to the extent that the prediction process does not use information from reference pictures areas extending beyond the picture's 22 borders. Likewise, internal boundaries of input picture 22 may become picture borders within picture 26 and encoder 70 may restrict temporal prediction of motion vector side information accordingly with respect to internal boundaries of input picture 22. Re in-loop filtering, video encoders 70 may be set to use or not use in-loop filtering in providing input video data streams. If in-loop filtering is signaled to be used in the input data video data streams, apparatus 10 may adopt in-loop filtering of the corresponding spatial portions of the inherited pictures 22 and if signaled not to be used in the input data video data streams, apparatus 10 may not apply in-loop filtering of the corresponding spatial portions of the inherited pictures 22. If in-loop filter is used, however, apparatus refrains from activating in-loop filtering of inherited pictures 22 in such a manner that the in-loop filtering crosses the border of spatial portion 20 in the inherited pictures. No additional in-loop filtering is activated by apparatus 10 in the no-output pictures 30, for example, so as to not change the reference picture content.

Further, in case of using more than one video encoder 70, it may be advantageous to synchronize these video encoders 70 with respect to the temporal prediction GOP structure illustrated in FIG. 1 using the arrows 24 and/or further coding tools and parameters.

Further, the video encoder 70 may, as outlined above with respect to FIG. 4, use a temporal hierarchy coding concept in generating data stream 14 and with regard to a subset of the temporal hierarchy levels, video encoder 70 may, on a voluntary basis, refrain from the usage of temporal motion-compensation side information prediction, i.e. refrain from using pictures of the respective subset of the temporal hierarchy levels as a reference for TMVP, with guaranteeing this non-usage to apparatus 10 using the above outlined guarantee signaling via respective high-level syntax of data stream 14 so that apparatus 10, in turn, may identify those pictures 22 of the inbound data stream 14 at which a change of the spatial portion's 20 spatial location may take place.

As will also become clear from the description of specific application scenarios described with regard to FIGS. 6 to 10, the video encoder(s) 70 generating the input video data stream(s) 14 may be configured to encode videos captured by a respective video camera, wherein this video encoding may take place on the fly or in real time, respectively. The video encoder 70 may be integrated within such a camera. The apparatus 10 may be included within a server while decoder 72 may be integrated within a client of that server. Even alternatively, however, apparatus 10 is also implemented at the client side thereby extending in an inexpensive manner a (standard) decoder's 72 capability to achieve the above-outlined composition freedom by merely serially connecting apparatus 10 upstream to decoder 72. The embodiments described below relate, for example, to a teleconferencing system where, for example, the decoder 72 is part of a participant's client. Alternatively, the decoder 72 may be a client such as a head-mounted display occasion, retrieving a panoramic video sub-portion out of a panoramic video array with the composition being performed by video composition apparatus 10 in a manner outlined in more detail below. The video composition apparatus 10 itself may be implemented in form of software running on a computer or the like, while the decoder 72 may be implemented using software, hardware or a programmable hardware on a mobile device, Although not illustrated in FIG. 5, it may be that the request 60 arriving at video composition apparatus 10 may stem from the decoding side. Alternatively, request 60 is manually generated at some control point, such as supervising entity.

In the following, embodiments are described according to which the embodiments of FIGS. 1 to 5 are used concurrently with respect to more than one input video data stream. In the following description, the no-output pictures 30 are called generated-reference-pictures (GRPs). They substitute reference pictures with respect to a plurality of input video data streams. As described above, GRPs are composed pictures inserted into the composed video data stream/bitstream that are not output and target to replace the original reference pictures at a certain position in time when decoding the composed video data stream. Further details about GRPs, beyond those already presented above, are presented in the following using several sample applications, but are applicable to further applications as well. In particular, such details shall also be individually transferable onto the above description.

Figure 6:
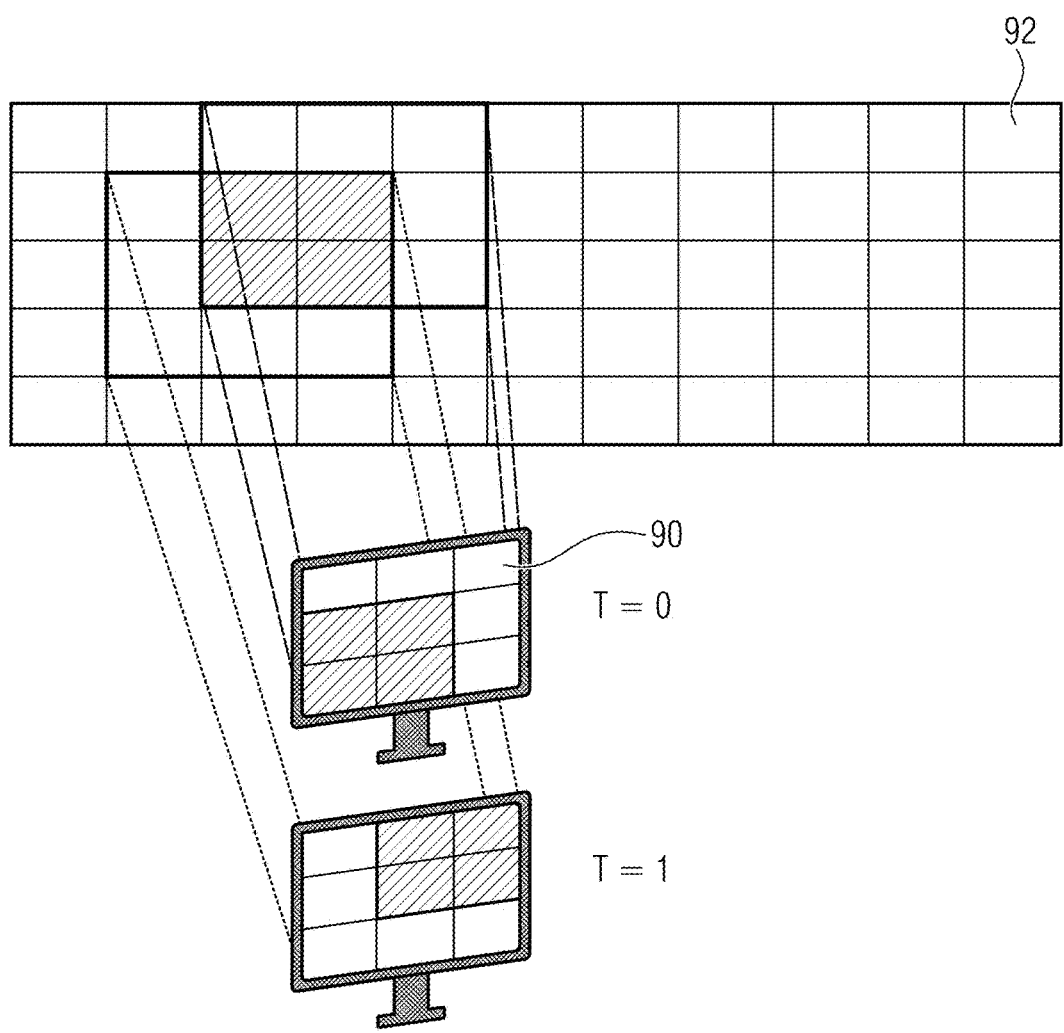
FIG. 6 shows a panoramic streaming application.

FIG. 6 represents a tile-based panoramic streaming application. The way panoramic streaming is realized today is by having a dedicated server that tracks the client region of interest (ROI), i.e. the content area display on the client device, and transcodes the panoramic video into a video that only contains the ROI for the given client. Such an approach has the drawback that it does not scale well. However, with HEVC, for example, a video bitstream can be split into smaller parts called tiles. Tiles are partitions in the form of small rectangles of the picture, which can be encoded in such a way that temporal dependency among different tiles is removed [2]. However, if tiles are decoded independently a single video decoder could not be used and therefore a tile stitching procedure similar to the technique shown in [1] is necessitated.

Two time instants, i.e. T=0 and T=1, featuring client screen movement are depicted in FIG. 6, where T=1 represents the switching point for the interactive streaming at which the client side changes the position of the presented tiles. In a panoramic streaming scenario, clients typically navigate over the panorama by selecting the ROI adaptively over time, e.g. by user interaction or an automated process such as ROI recognition.

This means that the position of the received/downloaded tiles with respect to the whole panoramic sequence changes over time. Any tile at a new position received during the streaming process at T=1 (i.e. not previously received at T=0) necessitates random access at the decompressed video content of this tile as former time instant T<1 is not available to the decoder for referencing.

However, a second set of tiles of positions that were received before does not necessarily necessitate random access since the information for the tiles in this set has already been received. These tiles are indicated using shading in FIGS. 6 and 7. For those tiles, only the position in the output picture is different from the position in the already decoded ones being available for reference. Thus, the technique described in [1] cannot be used as is. Temporal prediction from the regular reference frames in the video decoder buffer fails for this second set of tiles, since the referenced pictures would have different information than the one encountered on encoder side.

Figure 7:
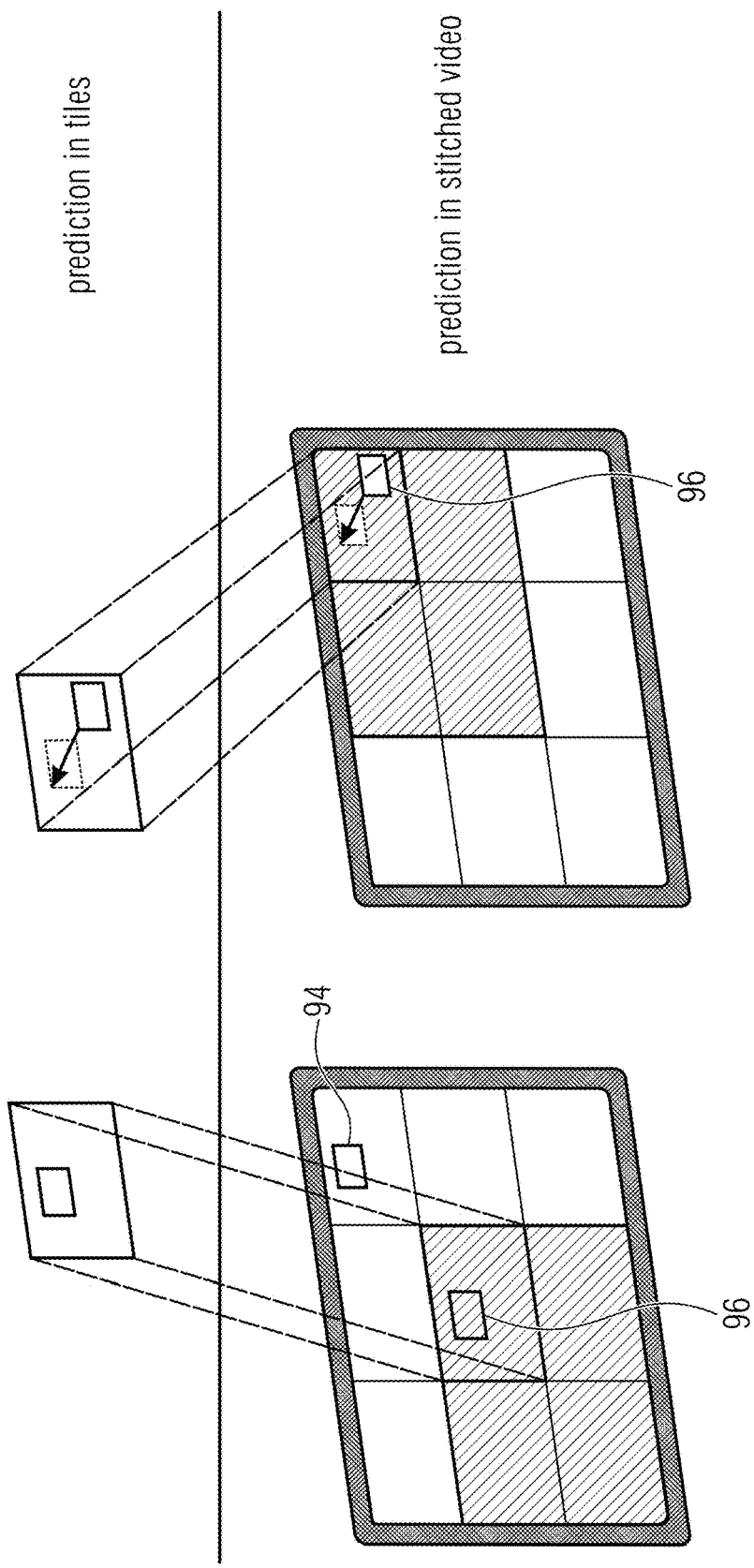
FIG. 7 shows failed temporal referencing due to position change.

As a minor intermediate note, it is noted that a nine tile partitioning of the composed video has been chosen in FIGS. 6 and 7 for illustration purposes only and that naturally some other partitioning may be used as well. The tiles are indicated using reference sign 90. As will become clear from the description below, the tiles of the composed video data stream represent possible spatial locations of a spatial portion where a respective input video data stream may be displayed. In the panoramic application scenario depicted in FIG. 6, many input video data streams are available: in the example of FIG. 6, 11×5 input video streams 92 cover a panoramic video scene in that the input video data streams 92 all capture a different spatial portion of the panoramic scene, the spatial portions bordering each other, for example, gaplessly and being spatially distributed in an array manner in columns and rows as depicted in FIG. 6, so that videos 92 are associated with panoramic scene portions arranged in columns and rows, respectively. At each time instant, the composed video data stream depicts within its 3×3 tiles merely a 3×3 submatrix out of the 11×5 input video data streams 92.

FIG. 7 illustrates that due to the new position of the tiles in time instant T=1, the reference used in the stitched video, i.e. the composed video data stream, which reference is indicated at 94 in FIG. 7, would be different from the original one on encoder side illustrated using blocks 96 in FIG. 7, leading to a drift that would disallow using temporal prediction for the non-refreshed portions dashed with lines in FIGS. 6 and 7. Thus, also tiles which have been received and are relocated to a new position in the composed/stitched output signal necessitate random access so that temporal prediction is disallowed, leading to a higher bitrate of the received composed bitstream. The concept of GRPs solves this problem.

Figure 8:
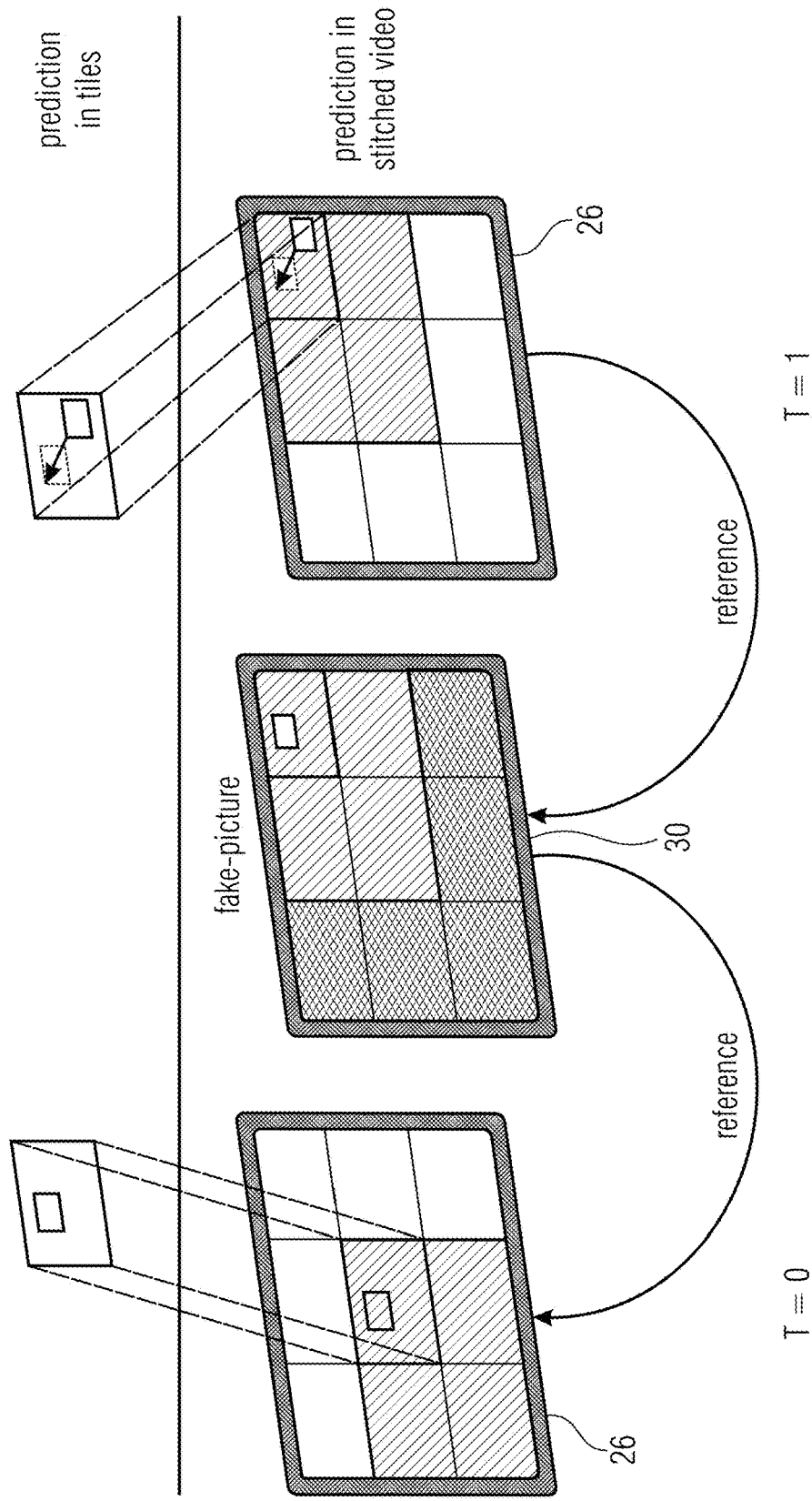
FIG. 8 shows an Illustration of the Generated Reference Picture concept.

FIG. 8 illustrate the GRP concept that solves the aforementioned problem with respect to FIGS. 6 and 7. A GRP is a picture that performs a displacement of the content of a regular reference picture so that following pictures can use temporal prediction of the tiles (i.e. regions of the video) that were previously received and are displaced to a new position in the composed/stitched video at and after the streaming switching point which was indicated 28 in FIG. 1. GRPs are only used for reference and are not output.

Before proceeding with the next application's scenery, where the embodiments of FIGS. 1 to 5 are applied to a case of using several input video data streams, the just mentioned embodiment is briefly explained by combining FIGS. 1 to 8. In particular, in accordance with the embodiments described above with respect to FIGS. 6 to 8, the system of FIG. 5, for example, would comprise one video encoder 70 per panoramic partial video 92, i.e. 11×5 in the exemplary embodiment of FIG. 6. The video composition apparatus 10 would stitch a subarray of for example 3×3 inbound video data streams into a composed video data stream. Whenever the subarray moves across the array of input video data streams 92, video composition apparatus 10 performs the insertion of no-output pictures or GRPs, wherein the inserted GRPs 30 at that time instant 28 would comprise artificial motion-compensation side information at tile positions corresponding to input video data streams which were already part of the subarray preceding time instant 28. In case of a diagonal movement of the subarray, these are 4 in number, while a horizontal or vertical movement co-owns six data streams before and after each switching time instant. In the case of FIG. 6, for example, four input video data streams which are part of the subarray after the time instant, namely at T=1, were already part of the subarray previous to the time instant, namely at T=0, namely the ones indicated using shading. The GRP or GRPs inserted at time instant 28, i.e. between inherited pictures 26, in FIG. 8 would, in a translatory manner, copy the content of the tiles where these four input video data streams were previously positioned, to the new tile positions of these four input video data streams. The GRP(s) could perform this, hence for several input video data streams 14 in parallel. In the case of this panoramic application scenario, the artificial motion-compensation side information would instantiate a translatory movement for the spatial portion corresponding to all input video data streams remaining in the currently displayed composed video data stream. In the application scenario described next, this might be different, i.e. the artificially generated motion-compensation side information for GRPs may be translatory for one input video data stream, but the motion direction may be different for different input video data streams handled in parallel.

Figure 9:
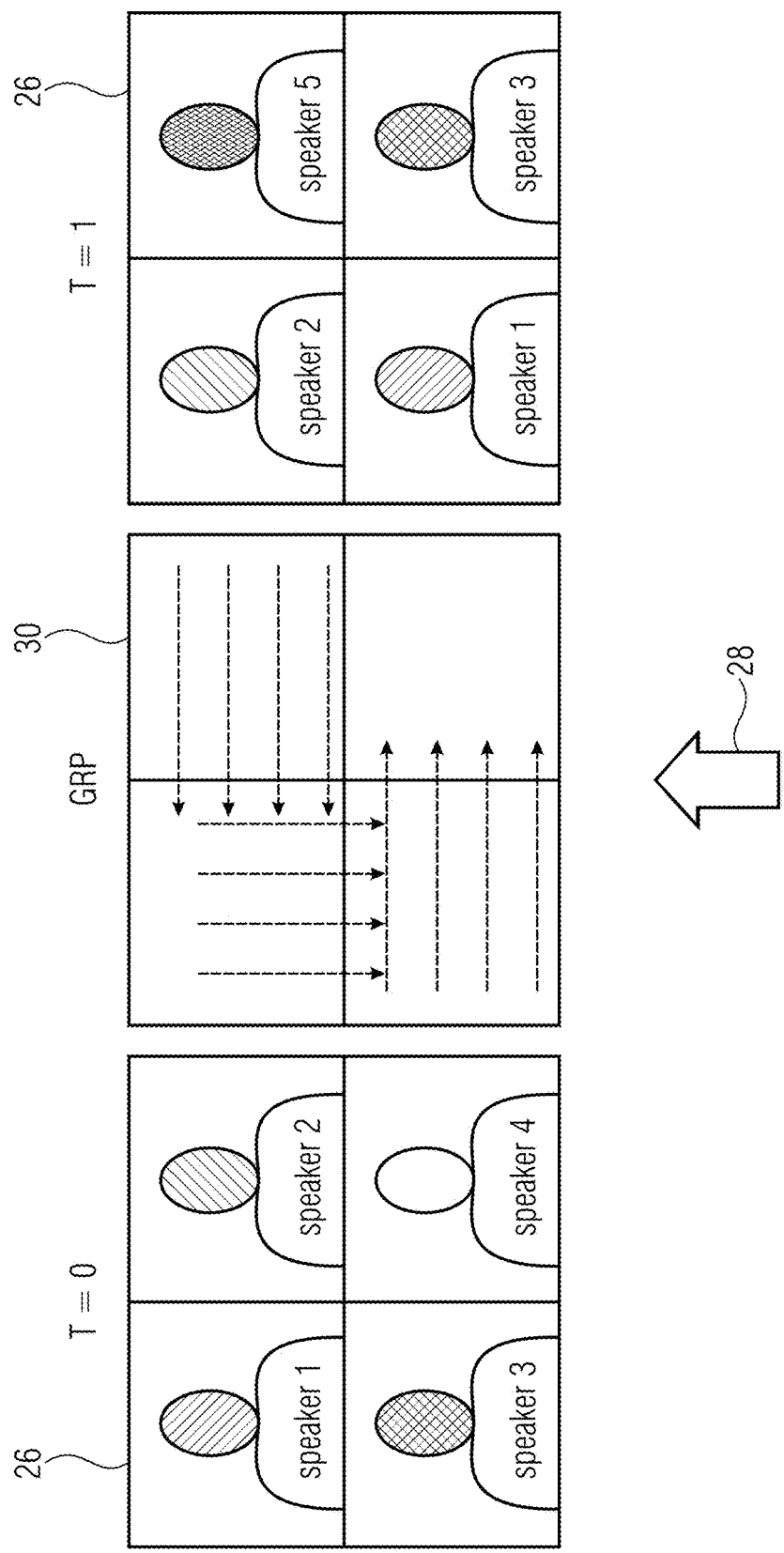
FIG. 9 shows GRP in context of video conferencing.

In particular, while the GRP concept was described above in the context of a panoramic streaming application with respect to FIGS. 5 to 8, a different example is presented below with respect to FIG. 9. As mentioned before, the GRP allows other applications as well, e.g. video conferencing. In a video conferencing system, the video bitstreams of all participants are composed/stitched in a roughly similar manner into a single video bitstream. On change of the speaker composition layout, e.g. through speaker change or participant fluctuation, GRPs are added to the bitstream to allow correct temporal prediction for participant video bitstreams that changed position in the composition. In such an application, the motion vectors in a respective GRP are not necessarily constant throughout the GRP, but at least for the area covered by each participant's video bitstream as illustrated in FIG. 9, where two different compositions are given for T=0 and T=1 and the motion vectors of the GRP are illustrated as well. Thus, in this case, more slices or tiles might be used that correspond to the layout scheme so that for each speaker a single coding unit has motion vector information and the rest of the coding units for that speaker encoded is skipped. In other words, the GRP 30 of FIG. 9 may be encoded in a manner similar to the description brought forward above with respect to FIG. 3: picture 30 may be subdivided so as to result in one spatial portion 20 per input video data stream present before and after the switching instant 28, which is exemplarily 3 in the case of FIG. 9, and using spatial prediction the displacement of the spatial portion for each of these three input video data streams may merely be encoded once for each of these 3 input video data streams, i.e. for merely one block within the respective spatial portion, while spatial prediction may be used in order to circumvent signaling the translatory motion of each input video data stream anew for the remaining blocks within the same spatial portion, respectively.

A further targeted application for the GRP concept is panoramic streaming to head-mounted displays typically found in virtual-reality or tele-presence use cases with varying random access rates and streaming control in the input streams 14. In the mentioned application, the available video streams likely cover up to 360-degree viewing angle at the camera(s) position. Likewise, a rather large part of the available viewing angle video is presented simultaneously to a user to provide for peripheral vision. Furthermore, adjustment of displayed region of the panoramic video due to head movement is likely to happen at much shorter intervals and higher speed than on e.g. touch-based input systems.

Figure 10:
FIG. 10 shows a 360-degree panorama from a remotely controlled vehicle.

In some cases there is a clearly advantageous region of interest (ROI) area in the video stream, e.g. direction of movement on a remotely controlled vehicle or the like as illustrated in FIG. 10. Picture areas that lie within the region can be encoded with a coarser (or zero) random access rate as reference video is intended to be available at the decoder side (i.e. constantly decoded) even if not displayed to provide instantaneous access if indicated. Other viewing angles (peripheral area) provide a relatively fine random access rate to provide for occasional changes of viewing direction. The stitched video in this scenario contains the ROI and optionally parts of the peripheral areas. GRPs are then generated as described before depending on presented video area.

Compared to the technique outlined in [1], the GRP concept outlined above may involve some extensions and the following list details constraints and properties that the input video data streams 14 and the GRPs may obey and comprise, respectively.

Temporal motion vector prediction: Some bitstream constraints on the basis of which the input video data stream 14 is generated were already discussed above, such as some restrictions concerning the motion vectors at edge portions of the pictures 22. In addition thereto, temporal motion vector prediction (TMVP), i.e. temporal prediction of motion-compensation side information, may be restricted so that no pictures that may be substituted by GRPs are used for TMVP. Typically, in the listed exemplary applications there will be switching points defined that are used for changing the ROI or speaker layout from this point in time onward. For example, if hierarchical prediction temporal scalability is used, the switching points may, for example, be selected as the temporal level 0 pictures or pictures of some other subset of available temporal layers. In this case, no picture with temporal level 0 is selected for TMVP, as this picture can possibly be changed to a GRP. Alternatively, TMVP may be disabled for all temporal levels at switching points for an amount of pictures/time determined by the prediction structure. The GOP structure may be maintained constant over the bitstreams so that stitched pictures have the same value of the temporal level indicator and the rewriting process is simplified.

Reference picture sets: in order to avoid an increase in the necessitated memory at the receiver/decoder and reduce the necessitated decoded picture buffer (DPB) size, it is favorable that the input video data streams use the same prediction structure overall, so that the amount and size of reference picture set (RPS) can be kept minimal when the input video data streams (e.g. tiles) are mixed/stitched/composed in a synchronous fashion, especially when some have an I slice and some P or B slices. Consistent RPSs may be selected, e.g. when an HEVC IDR or CRA of one input video data stream is converted to a trailing picture with an I slice in the composed video data stream, a non-empty RPS may be selected that matches the RPS of the tiles, which the I slice tile is mixed/stitched with, and for following slices that use only the I slice as reference a coherent (to other tiles) RPS may be indicated, and the syntax structures that identifies the I slice as unique reference picture, syntax structures for reference picture list and picture index have to be added to the slices.

Picture order count (POC): the insertion/addition of GRPs 30 may be accompanied by apparatus 10 changing further POC values when comparing the POC values of the input pictures 22 and the corresponding inherited pictures 26 on the other hand. The POC difference of the GRPs maintain the same as the substituted original pictures, which can be achieved by defining a POC delta, which is greater or equal to the biggest POC difference of all pictures in the DPB plus one. This POC delta is used for GRPs to compute the POC value by adding it to the POC of the substituted picture in DPB. The sum of all POC deltas from the last IDR may be added to the POC value derived from the slice header. Additionally, further high level syntax structures may necessitate adaptation, for example in the case of using HEVC, vui_poc_proportional_to_timing_flag in VPS may be unset in the output stream.

In-loop filters: additionally, in order to avoid a prediction drift of pictures following the GRP(s) 30 due to a modification of the original input video stream pictures 22 when spatially relocated through prediction (arrows 34), in-loop filters in GRPs 30, such as deblocking and sample adaptive offset filter in HEVC should be disabled, e.g. in the PPS, i.e. no additional in-loop filtering on top of the in-loop filtering performed by the video encoder 70 may be applied to the GRPs 30.

Tiles and slices: in order to reduce the inserted amount of data, apparatus 10 may keep the structuring of GRPs through tiles and slices at a minimum as it introduces unnecessary signaling overhead. However, a tile/slice setup similar to the stitched pictures or any other may be a necessitated/favorable implementation or source video-wise.

Output signalization: as described above, the video codec underling the composed video data stream enables the signalization of an output property for the GRPs, i.e. that GRPs are not output and solely used for referencing, e.g. through the output_flag in HEVC slice headers. The presence of such a syntax element in a slice header might necessitate an additional PPS that signals its presence in the slice referencing to that PPS.

Parameter set insertion: GRPs do not necessarily share all properties signaled in their respective parameter sets with the other pictures of the stream. Therefore, it might be favorable to insert additional parameter sets into the output bitstream for the GRPs to refer to.

GRP NAL unit(s): encoding GRPs by using Coding Units (CUs) or blocks of the biggest possible size is favorable in order to produce as little bits as possible. The first CU or block may be encoded, as outlined with respect to FIG. 3, indicating the necessitated displacement of the picture, i.e. how many pixels and in which direction the respective tile(s) are moved. The rest of the CUs or blocks are encoded in skip mode or the like, since the movement is the same for all CUs of the respective spatial portion. However, CU sizes of the input streams or individual motion per picture area may motivate smaller CU sizes. The GRP slice may include a new RPS or an index to the RPSs in the SPS that marks the substituted pictures as not needed for reference, when necessitated. The latter means that once pictures are substituted by GRPs and further GRPs are included, the RPSs of the further GRPs do not include references to the original pictures to keep the DPB memory requirement low.

SPS consistency: IDRs may activate a new SPS with values that differ from the previous active SPS. However, in order to be able to stitch together different bitstreams in a single bitstream it is a requirement that SPSs of the different streams are consistent. In order to rewrite an IDR to an I slice of a trailing picture and stitched with other non I slices, it may not activate an SPS with syntax elements differing from the previous active SPS one.

With regard to the above description it should be noted that GRPs 30, in the form of slice data or slice payload section 42 for example, can be pre-encoded for insertion. That is, apparatus 10 could have a sets of such pre-encoded GRPs 30 matching the envisioned input data stream configurations. In this manner, such GRPs could be inserted into the composed video data streams 18 since their slice payload content depends only on high-level parameters such as picture dimensions, displacement or tile structure. This allows, for example, an implementation without actual entropy coders such as a context-adaptive binary arithmetic coding (CABAC) engine for H.264/AVC or HEVC coded content, for example.

Figure 11:
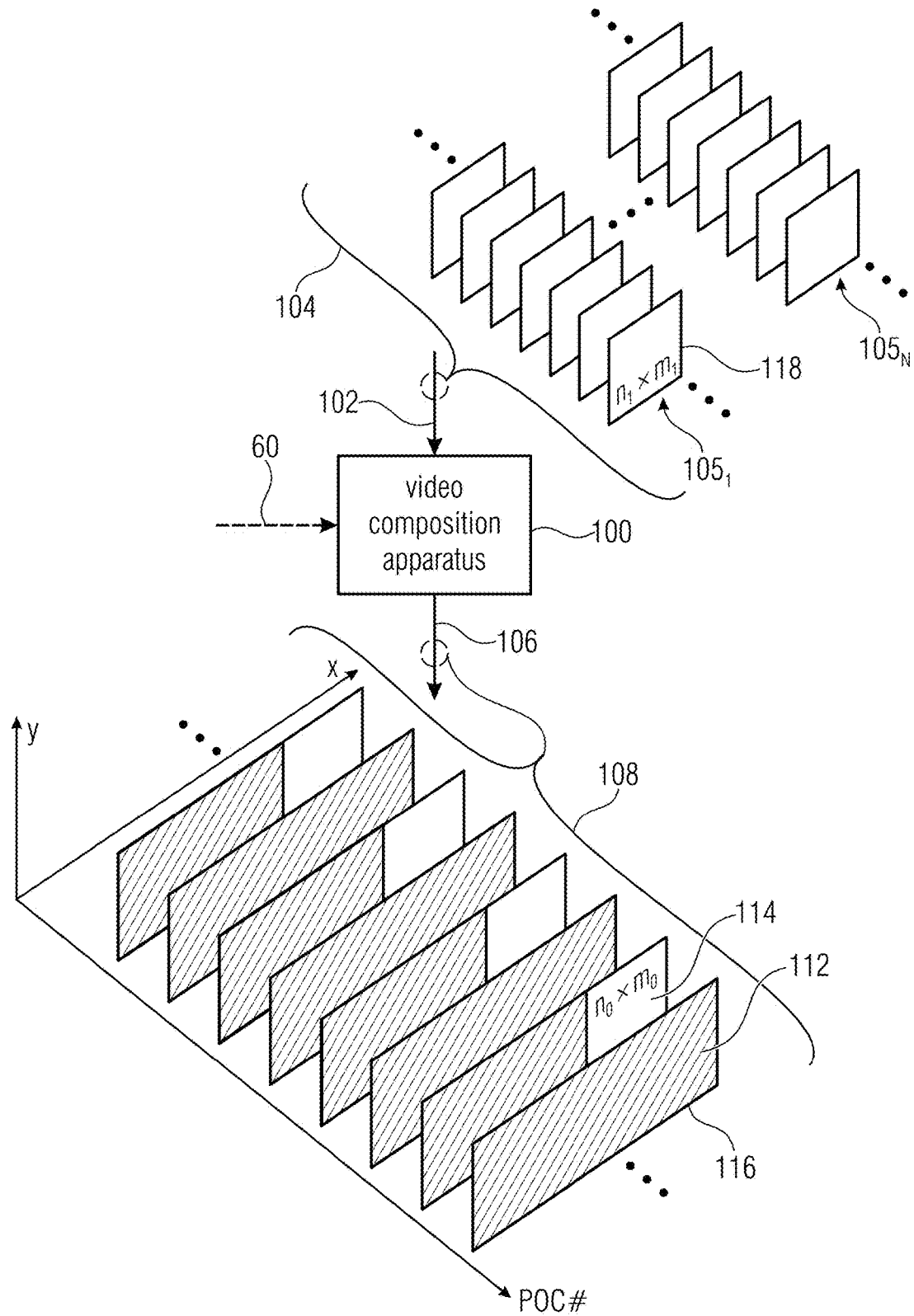
FIG. 11 shows a schematic block diagram of video composition apparatus along with a schematic representation of a plurality of input video data streams and the composed video data stream in accordance with an embodiment.

Within the above-outlined embodiments, there were embodiments which composed several input video data streams into one composed video data stream. In the following, embodiments are described which achieve the composition of a composed video data stream or of a plurality of input video data streams using a slightly different concept. FIG. 11 shows an apparatus 100 with an input 102 for receiving the plurality 104 of input video data streams $105_1$, $105_2 \ldots 105_N$ and an output 106 for outputting the composed video data stream 108. The index of the input video data streams is sometimes left out in the following description. The input video data streams 105 and the composed video data stream 108 are encoded using motion-compensated temporal prediction.

In a manner outlined in more detail below, the video composition apparatus 100 of FIG. 11 is able to compose a video out of the inbound input video data streams 105 at a composition freedom which is increased compared to the embodiments described above with respect to FIGS. 1 to 10, but at the cost of enlarging the picture number to spatial dimension space spanned by the composed video data stream 100. Generally speaking, the video composition apparatus 100 of FIG. 11 "hides" the input video data streams 105 within a reference portion of the composed video data stream 100, not to be output, while a further portion of the composed video data stream, synthetically generated by video composition apparatus 100, composes a collated video by referencing, via motion-compensated temporal prediction, various areas out of the reference portion. The latter portion of synthetically generated content is the portion of the composed video data stream 100 to be actually output at the decoding side.

Figure 12:
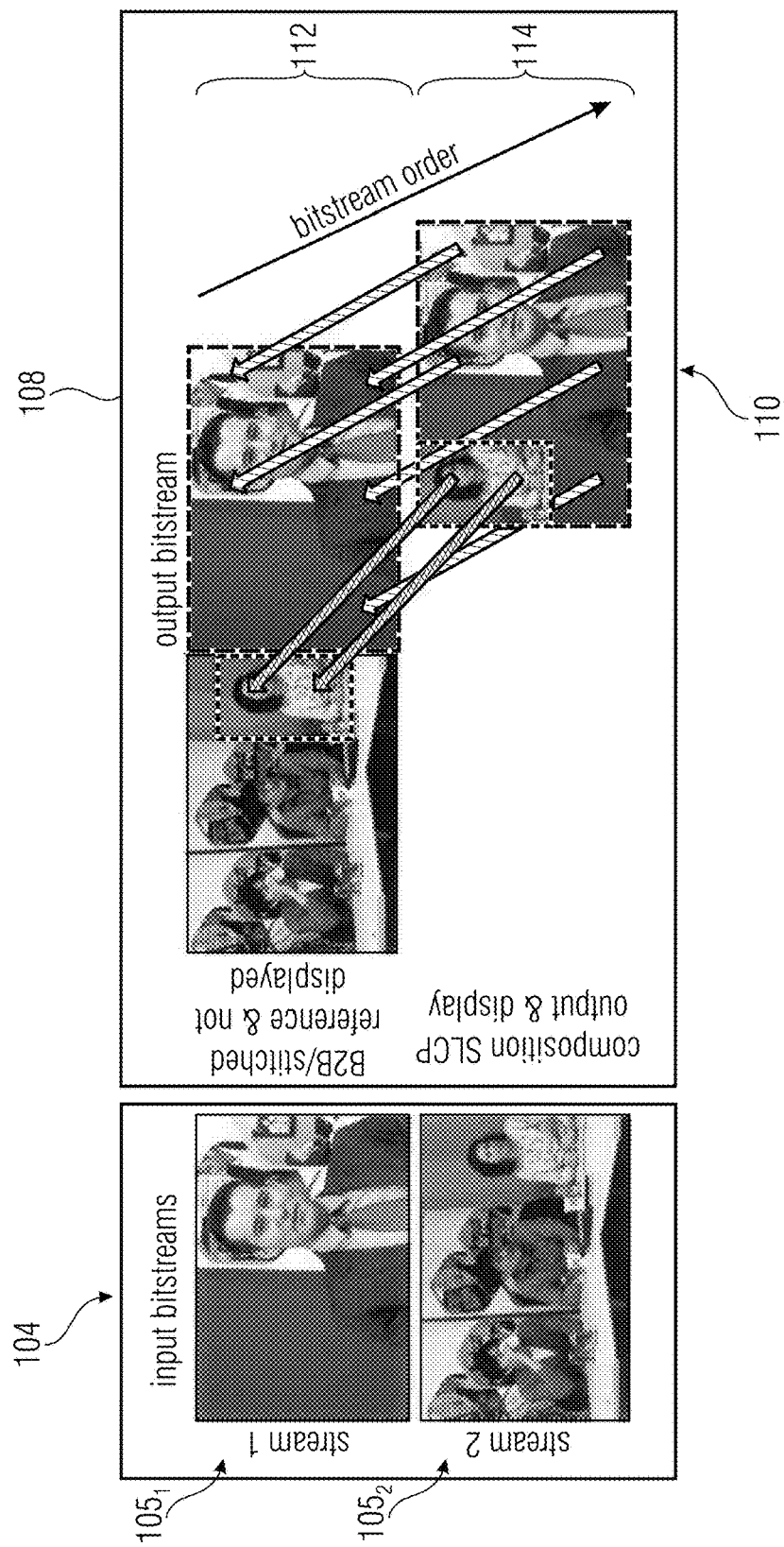
FIG. 12 shows a schematic diagram of an SLOP of the composed video data stream's collated video portion along with dashed arrows illustrating motion/prediction vectors copying from the composed video data stream's reference portion.

In other words, in accordance with a concept of FIG. 11, a number of input video data streams 105 is processed in the compressed domain by apparatus 100 to create a single output video data stream/bitstream 108 that when fed into a single decoder produces a spatial composition of the multiple input video data streams/bitstreams 105. FIG. 12 illustrates a first illustrative use case where the content of one input bitstream (stream 1) $105_1$ is overlaid with parts of another input bitstream (stream 2) $105_2$ in order to compose the intended composition 110 achieved by decoding the output bitstream 108. In a manner outlined in more detail below, to this end, the output data stream 108 comprises a reference portion 112 carrying the video content of the input data streams $105_1$ and $105_2$ and the composition portion to be actually output, which references, via motion-compensated temporal prediction, the reference portion 112. In FIG. 12, differently hatched arrows illustrate the used referenced areas out of the input video data streams 105. In other words, same shall illustrate prediction vectors for creation of the composed video content in portion 114. More details are presented below.

Referring back to FIG. 11, the video composition apparatus 100 multiplexes the plurality of input video data streams 105 into a reference portion 112 of pictures 116 of the composed video data stream 108 by collecting and copy motion-compensation side information and prediction residual data of the plurality 104 of input video data streams 105 into the first portion 112. The second portion 114 of the pictures 116 of the composed video data stream 108 is filled with a synthetically generated collated video by referencing, via motion-compensated temporal prediction, the reference portion 112. While the reference portion is signaled in the data stream 108 to be not output, the second portion 114 is signaled to be output.

As will be outlined in more detail below, there are several possibilities as to how to multiplex the input video data streams 105 into the reference portion 112. Let the "video amount" conveyed by a certain input video data stream $105_i$ denote, for example, the number of samples per picture 118 of the respective input video data stream 105, such as $n_i \times m_i$ times the numbers of pictures per second such as $t_i$, and lets further denote the "video amount" of the second portion 114 as the number of samples per picture of the collated video such as $n_o \times m_o$ time the number of pictures per second, then the collated video data stream 108 comprises, for example, at least $n_o \times m_o \times t_o + \Sigma n_i \times m_i \times t_i$ samples per second. Picture size variations among the video input datatreams may lead to dummy data filled areas being added to the minimum size as will be explained with respect to FIG. 15. Various ways exist how the input video data streams 105 may be "hidden" or multiplexed into the reference portion 112. To this end, for example, the reference portion 112 may comprise no-output pictures and/or picture areas of output pictures of the composed video data stream 108 to be cropped. More details are described in the following.

In other words, the concept of FIG. 11 uses several input bitstreams 105 to create a part 112 of a new single output bitstream 108 through multiplexing. The pictures 118 or parts thereof of the input bitstreams 105 that are intended to form the composition to be output at a single time instant are referred to as the pictures in a set of reference pictures (PSRs) in the following.

Figure 13:
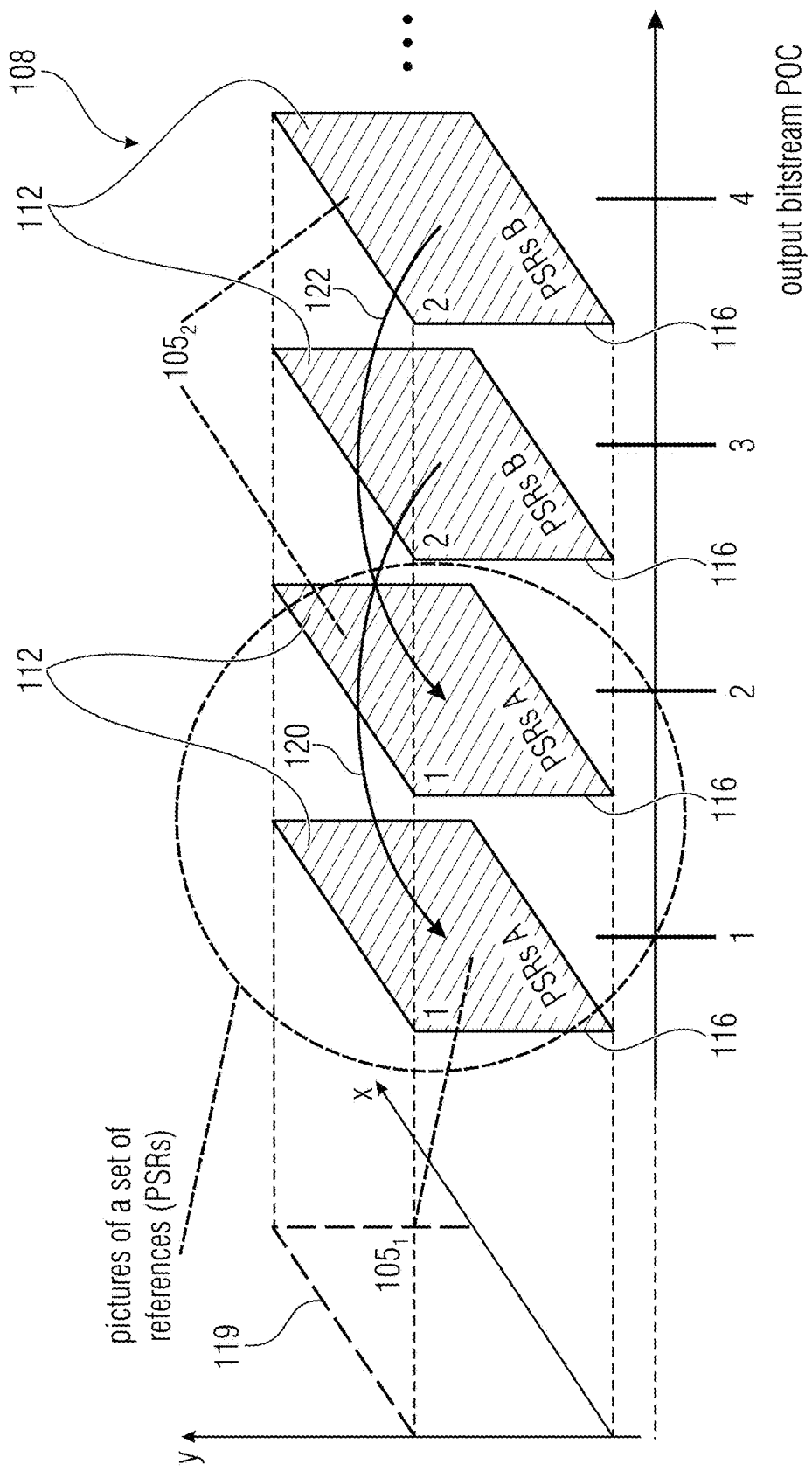
FIG. 13 shows an illustration of Back-to-Back referencing approach.

With regard to FIGS. 13 and 14, two alternatives for multiplexing the input bitstreams 105 into the reference portion 112 are described in the following in more detail. The first alternative is presented and illustrated with respect to FIG. 13. FIG. 13 illustrates the example where two input video data streams 105 both use an IPPP referencing GOP structure, but this was chosen in FIG. 13 merely for illustration purposes. The exemplary two input video data streams $105_1$ and $105_2$ of FIG. 13 are multiplexed using time division multiplexing, into a spatially stationary spatial portion 118 of at least a subset of the pictures 116 of the composed video data stream 108. That is, in the case of FIG. 13, the pictures 118 are alternately used to fill at least a subset of the pictures 116 of data stream 108 so that, as illustrated in FIG. 13, a pair of consecutive pictures 116 of data stream 108 has its spatially stationary spatial portion 119 filled with one picture 118 of input data stream $105_1$ and one picture 118 of the other input video data stream $105_2$, both being intended to form a composition video at the same time instant and belonging to the same instant in the two input video data streams $105_1$ and $105_2$, for example. For example, the pictures 118 of input video data stream $105_1$ may be of the same size as the pictures 118 of input video data stream $105_2$, i.e. $n_1 = n_2$ and $m_1 = m_2$, so that a respective spatially stationary spatial portion 119 of the same size in at least a subset of the pictures 116 of the composed video data stream 108 is filled by collecting and copying motion-compensation side information and prediction residual data of the respective pictures 118 of these input video data streams 105. Although thus depicted in FIG. 13, the pictures 118 of the input video data streams $105_1$ and $105_2$ on the other hand may however be of different size. Thus, in the output video data stream's reference portion 112, the pictures 118 of the input video data streams $105_1$ and $105_2$ follow each other in a manner which is called back-to-back (B2B) in the following. In other words, the pictures intended to form the composition at a certain time instant follow each other in the composed video data stream as individual pictures with distinct POC values. Due to the temporal interleaving of the pictures 118 of the input video data streams $105_1$ and $105_2$ in the output video data stream 108, apparatus 10 may amend reference picture order count difference values or references to sets of reference picture order count difference values in slices headers in slices of the pictures 118 of the input video data streams $105_1$ and $105_2$ in order to account for the change in the POC values of the pictures 116 into which the content of pictures 118 is adopted.

For example, in FIG. 13, two pictures of input video data stream $105_1$ are illustrated to be used to fill portion 119 of output pictures 116 of data stream 108. Owing to the original input video data stream's $105_1$ IPPP referencing structure, the first of these pictures forms a reference picture of a second of these pictures as indicated using arrow 120. In order to maintain this referencing in the composed video data stream 108, apparatus 10 may account for the fact that while the corresponding pictures in the input video data stream $105_1$ had, for instance, POC difference 1 as illustrated by small numbers "1" and "2" in the upper left hand corners of pictures 116, the POC difference between the pictures 116 of the output video data stream of the output video data stream 108 having the spatial portion 119 filled with the respective input pictures 118 now have a POC difference of 2, i.e. 3−1. The same applies with regard to the temporal prediction 122 between the pictures of input video data stream $105_2$ as indicated with reference sign 122.

Thus, while adjustments by apparatus 10 to a high level syntax information such as POC and RPS may be performed, the freedom in generating the input video data streams $105_1$ to $105_N$ by video encoders may be increased relative to the embodiments described above with respect to FIGS. 1 to 10. For instance, as the back-to-back approach of FIG. 13 does not involve stitching of input pictures 118 using tiles, encoder-decoder mismatches may not occur.

Figure 14:
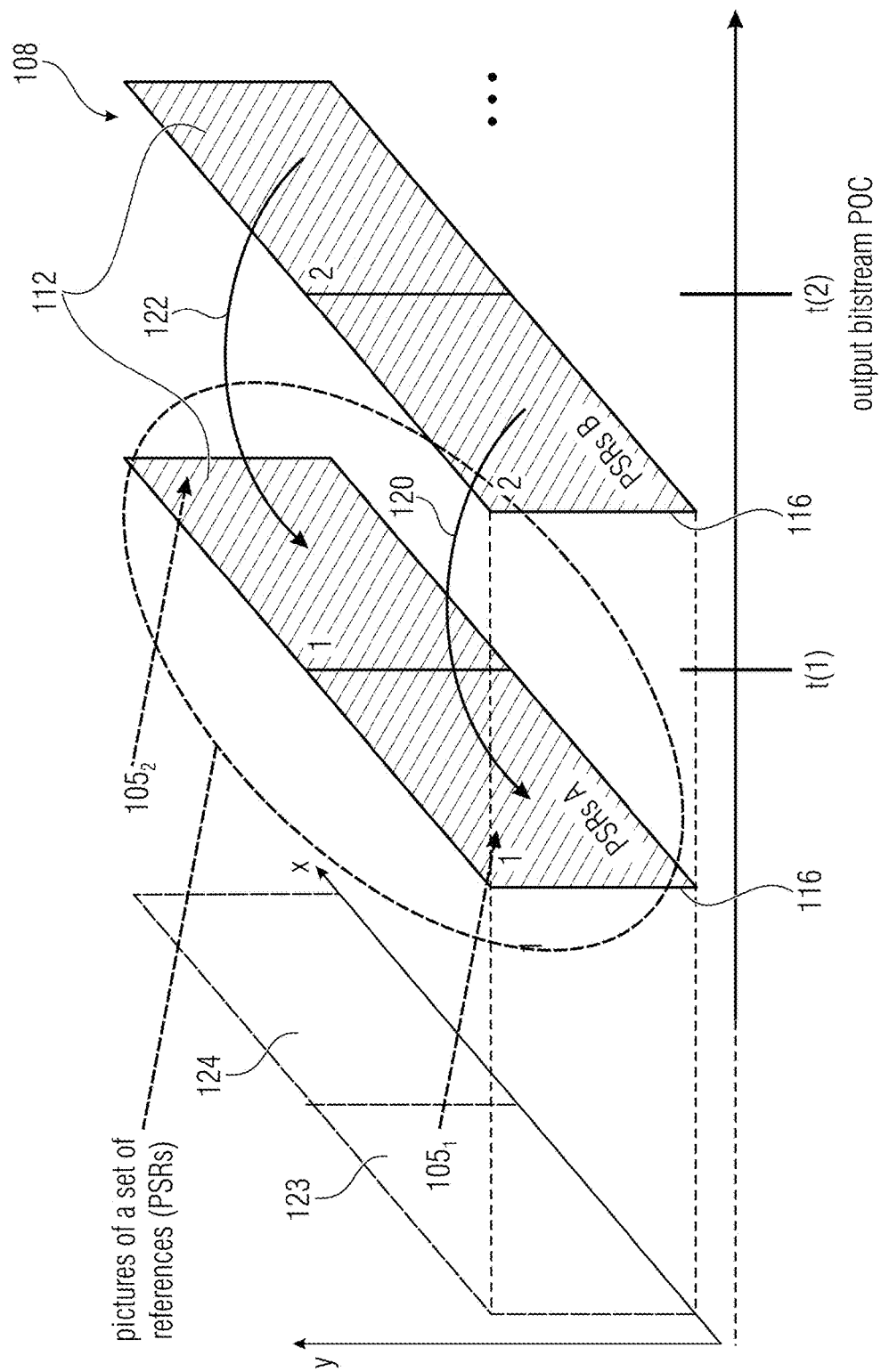
FIG. 14 shows an illustration of the stitched references approach.

A second possibility of multiplexing the picture content of pictures 118 of the input video data streams 105 into the reference portion 112 of the composed video stream 108 is depicted in FIG. 14. Here, spatial division multiplexing is used in order to multiplex the pictures 118 of the input video data streams 105 into data stream 108. The input video data steams $105_1$ and $105_2$ occupy different tiles 122 and 124 of pictures 116 of the composed video data stream 108. In particular, FIG. 14 illustrates the exemplary usage of the same referencing structure as in the case of FIG. 13. Here, the PSRs are stitched together as described in [1] and/or as described above with respect to FIGS. 6 to 10. Here, in comparison to FIG. 13, the picture size of the output bitstream, i.e. the size of pictures 116, increases with respect to the individual input bitstreams depending on the spatial dimensions of the stitched PSRs. That is, in the case of FIG. 14, apparatus 10 fills, for example, one picture 116 within a first tile 122 with a picture 118 of the first input video data stream $105_1$ and another tile 124 of the same picture 116 with a temporally aligned picture 118 of the video data stream $105_2$ and does so for the other pictures 116 as well. For instance, a next picture 116 of the composed video data stream 108 is filled using the collection and copying approach already outlined above with respect to FIGS. 1 to 13, at tile 122 using the next picture 118 of the input video data stream $105_1$ and at tile 124 using the temporally aligned picture 118 of the input video data stream $105_2$. Accordingly, temporally aligned pictures 118 of different ones of the input video data streams 115 are adopted into different tiles of one pictures 116 of the composed video data stream 108 and are, accordingly, associated in video data stream 108 with one common POC value indicated at t(1) for the first pictures 118 of input video data streams $105_1$ and $105_2$ shown in FIG. 14, and t(2) for the second pictures of these input video data streams $105_1$ and $105_2$. Depending on the way the second portion 114 is added to data stream 108 as described in more detail below, apparatus 10 may or may not amend reference picture order count difference values and/or references to sets of reference picture order count difference values in the composed video data stream 108 relative to the input video data streams 105. For example, as will be described in more detail below, it may be that the collated video potion 114 is conveyed within the composed video data stream 108 in a manner spatially attached to the reference portion 112, and in that case, a composed video data stream 108 may not comprise any pictures 16 beyond those having tiles 122 and 124 filled using the input video data streams 105 so that, for example, the relative POC difference referencing for the temporal prediction 120 and 122 remains the same. If the insertion of the collated video portion 114 into a composed video data stream 108 leads to an insertion of additional pictures 116 into the composed video data stream 108, not shown in FIG. 14, then apparatus 10 may amend high level syntax structures such as the picture order count value, the reference picture order count difference values or references to sets of reference picture order count difference values accordingly.

Thus, in the case of FIG. 14, the reference portion 112 consumes, for example 2×n×m samples spatially out of pictures 116 of the composed video data stream 108 belonging to the reference portion 112 when, as illustrated in FIG. 14, the pictures 118 of the input video data streams are of equal size n×m, for example.

The latter assumption that the pictures 118 of the different input video data streams 105 are of the same size does not necessarily need to be fulfilled. In both case, the pictures 118 of different input video data streams 105 may be of different size. In that case, some areas of the composed video data stream 108 may be filled with dummy content, as described in the following with respect to FIG. 15.

Figure 15:
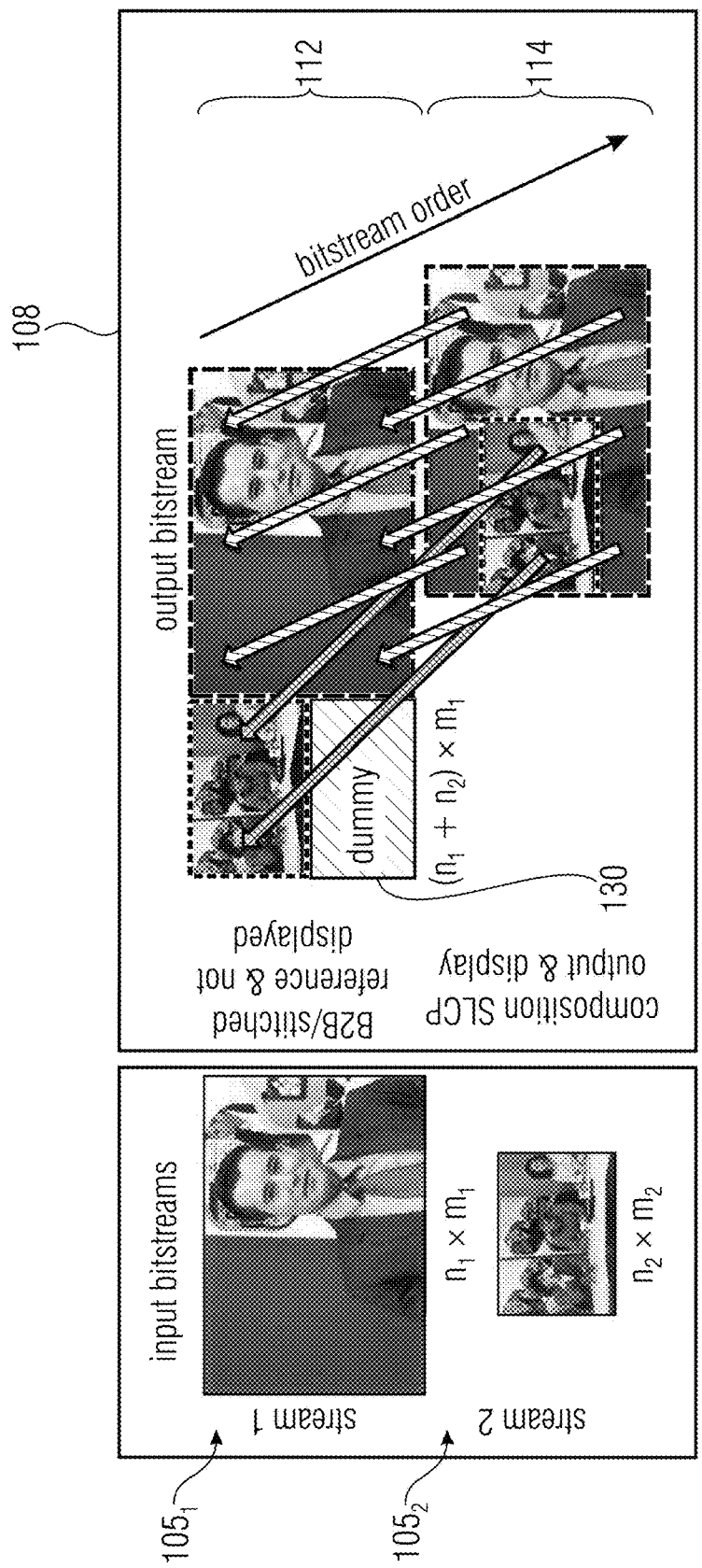
FIG. 15 shows a schematic diagram of an SLOP with stitched references of different spatial dimensions using the non-output approach.

FIG. 15 shows schematically the way of forming the collated video as FIG. 12 did, but now illustrates the case where the pictures 118 of input video data stream $105_2$ are of smaller size than the pictures of input video data stream $105_1$. In the stitched reference approach having been presented above with respect to FIG. 14, this would result, for example, in the reference portion 112 spatially consuming an area of $(n_1+n_2) \times m_1$ samples per picture 116 of the output data stream 108 as far as belonging to the reference portion 112, assuming that the size of the pictures of the first input video data stream $105_1$ is $n_1 \times m_1$ and the size of the pictures of the second input video data stream $105_2$ is $n_2 \times m_2$. In that case, a rectangular area within each picture 116 of the reference potion 112 may, for instance, be filled with dummy information 130. Naturally, the pictures of the input video data streams $105_1$ and $105_2$ could alternatively be stitched vertically to each other rather than horizontally as exemplarily depicted in FIGS. 14 and 15. Translating the just outlined method to the B2B approach illustrated above with respect to FIG. 13 could mean, for example, that each picture 116 of the composed video data stream having the spatial portion 119 filled with a picture 118 of input video data stream $105_2$ has the non-filled fraction of $(n_1 \times m_1)-(n_2 \times m_2)$ samples filled with dummy data. For example, the pictures 118 of the input video data streams $105_1$ and $105_2$ may all be registered to the upper left-hand corner of the stationary spatial potion 119 so that the dummy portion to be filled may be L-shaped along the bottom and right-hand side of portion 119.

The fact that FIG. 15 illustrates the size of the collated video portion 114 of the composed video data stream 108 is coinciding with the size of the greater one of the pictures of the first and second input video data streams $105_1$ and $105_2$ in FIG. 15 has merely been chosen for illustration purposes only.

Thus, FIG. 15 has illustrated that the input video data streams may be accompanied with dummy slices with arbitrary content when decoded and not used for reference by the collated video portion or SLOP 114. Dummy slices may be used to either align both spatial image dimensions of all input bitstreams 105 in the B2B approach or allow stitching by aligning at least one image dimension if necessitated, as can be seen in FIG. 15.

It is noted that for illustration purposes only, all of the following explanations employ the stitched reference approach, but that all of these following explanations may alternatively be implemented using the B2B approach as well.

Figure 16:
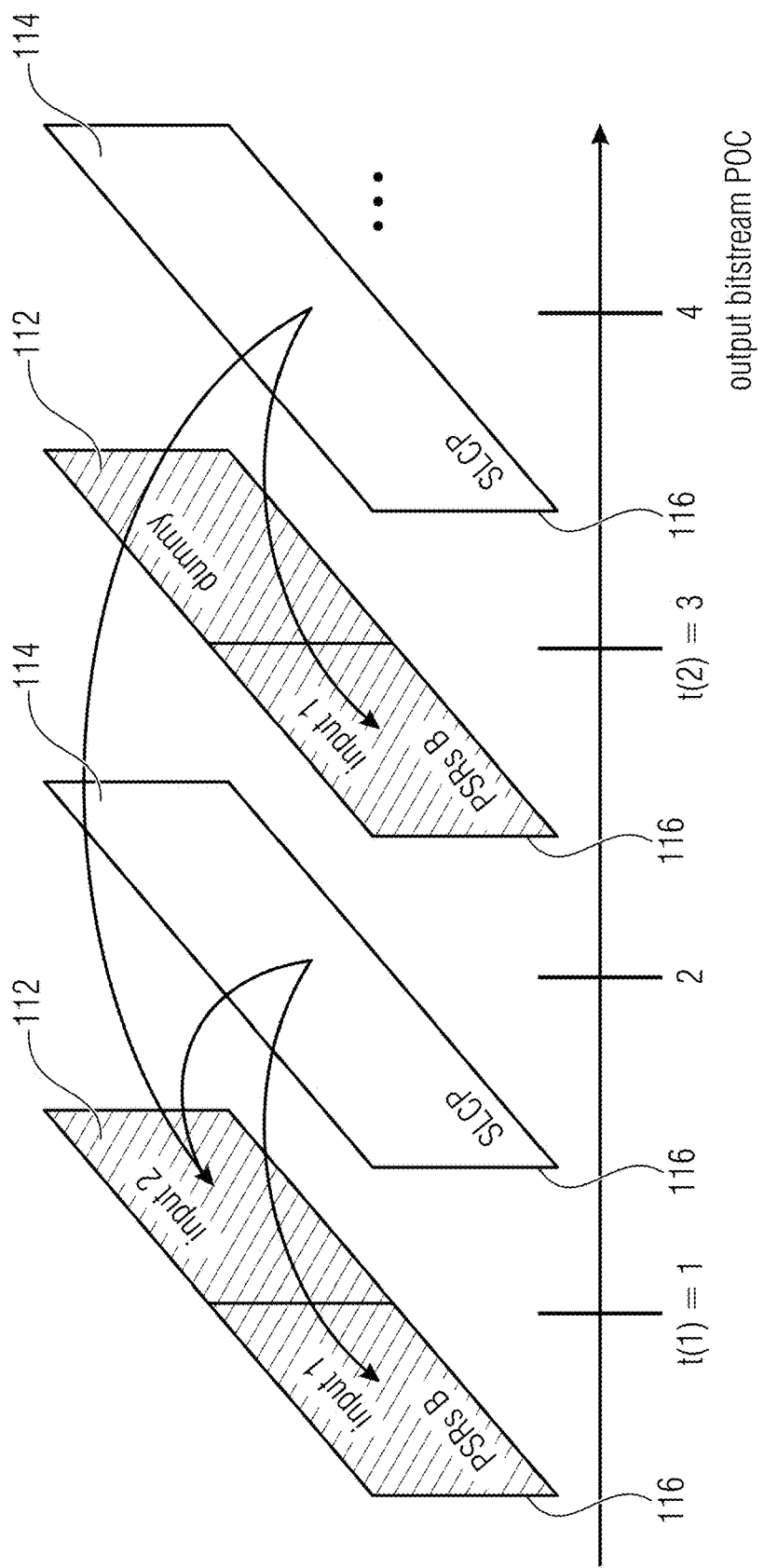
FIG. 16 shows an illustration of dummy usage for temporal resampling.

While FIG. 15 illustrated a possibility of how to deal with differences between the input video data streams in terms of spatial dimension, FIG. 16 illustrates the possibility that the apparatus 10 deals with input video data streams 105 of different frame rates. Input bitstreams 105 of different frame rates can be multiplexed by apparatus 10 into reference portion 112 by resampling the input bitstreams 105 of lower frame rates to the maximum frame rate encountered among all input bitstreams 105. One way to align frame rates in the composed video data stream 108 is by selectively adding dummy slices not used for reference and using the same reference picture (area) in multiple consecutive SLCPs as illustrated in FIG. 16 where the frame rate of input video data stream $105_2$ is exemplarily half the frame rate of input video data stream $105_1$ and the SLCPs are created at the highest available frame rate, i.e. the frame rate of input video data stream $105_1$. Likewise, the frame rate of SLCPs could, for instance, be lower than the maximum frame rate among the input video data streams, by not using, for example, some reference pictures of these higher frame rate input video data stream(s) for composition.

The RPSs should be set in such a way by apparatus 10 that references needed by the PSRs include all the necessitated reference pictures for all multiplexed streams. For the B2B approach, where references that belong to the same time instant do not share a common POC, this inevitably introduces an increase of size of each respective RPS. For the stitched references approach and when RPS is aligned (in terms of the actual RPSs and the references to the RPS) an increase in size or amount is minimal.

A straightforward implementation could, for example, signal a new RPS in the slice headers of reference pictures and/or SLOP pictures, although this might lead to a signaling overhead. However, this is negligible when the process is carried out on an end device without subsequent transmission. When the process is carried out on a remote entity, such as cloud servers distant to the end device, and is subsequently transmitted to the end device it may be beneficial to adjust RPSs in the parameter sets as suitable to minimize signaling overhead.

After merging/multiplexing the input streams 104 for reference into the reference portion of the output video data stream 108 so as to result in respective PSRs for each time instant, additional SLOP slice data that contains the composition by means of temporal prediction reference to the B2B or stitched reference picture portion 112 is generated and added as portion 114 to the data stream 108. This composed SLOP is intended for output by a decoder and/or display to the end user. The SLOP may consist of motion-compensation side information, such as prediction/motion vectors, that point to pixel positions in the PSRs to create a composition of the image contents through sample prediction.

Various possibilities exist for apparatus 10 to position the portion 114 relative to reference portion 112 in the picture order count-spatial access-space, some of them being presented below with respect to FIGS. 17, 18a and 18b.

The position of the SLCPs in the output bitstream 108 may be chosen depending on the applied referencing/multiplexing approach. For the B2B referencing approach presented above with respect to FIG. 13, for example, SLOP slice data may be multiplexed into the output bitstream 108 in the form of individual pictures with POCs distinct to pictures 116 of the output bitstream 108 into which the input pictures 118 have been multiplexed. In particular, in this case, portion 114 would comprise output pictures interspersed within the reference pictures shown in FIG. 13, the output pictures temporally arranged following the referenced PSRs. This is exemplarily illustrated in FIG. 17, which insofar extends the B2B approach as depicted in FIG. 13 by portion 114.

Figure 17:
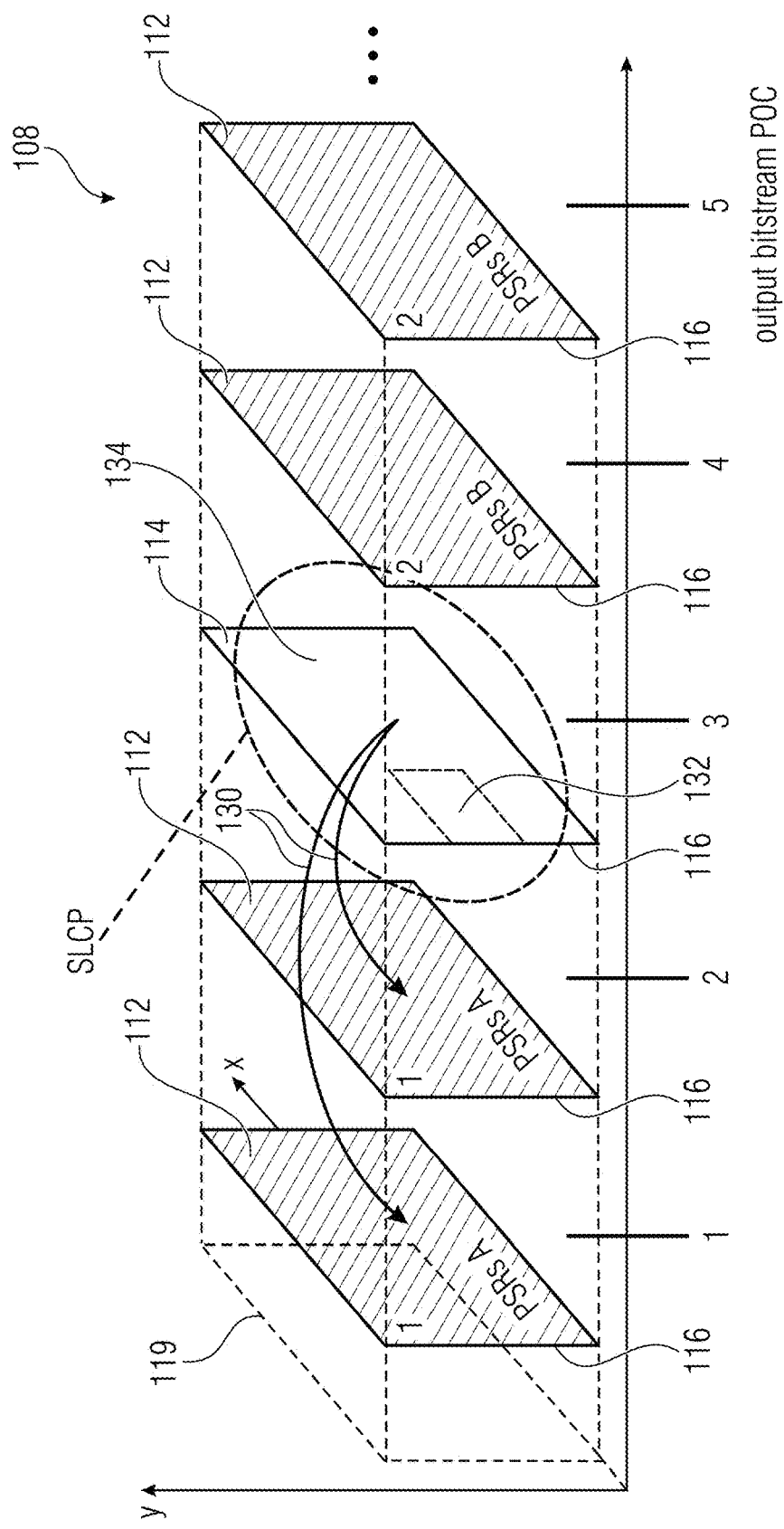
FIG. 17 shows an illustration of SLOP with B2B references.

That is, in accordance with FIG. 17, the apparatus 10 multiplexes, by way of time-division multiplex, the pictures 118 of the inbound input video bitstreams $105_1$ and $105_2$ into respective pictures 116 of the composed video bitstream 108 so as to form a reference portions 112 of bitstream 108, and intersperses between these pictures further pictures 116 filled with data which references, via motion-compensated temporal prediction 130, the pictures 116 forming the reference portion 112. In the example of FIG. 17, the whole area of the pictures 116 belonging to portion 114 may be dedicated for being displayed/output. Alternatively, merely a sub-part thereof may be dedicated for being output with the remaining parts being cropped-out. In particular, apparatus 10 may place a picture 116 between the pictures 116 belonging to the reference portion 112 in a manner temporally registered to each other so that pictures 116 of reference portion 112 belonging to one time instant and therefore forming a set of reference pictures are immediately consecutive to each other, and pictures 116 being part of portion 114 are interspersed between such pictures 116 of reference portion 112 having been filled by collecting and copying from pictures of input video data streams 105 or equal time instant. As already denoted above, the frame rate of pictures 116 belonging to portion 114 may be the same as the frame rate of pictures of the input video bitstreams 105. In the case of FIG. 17, pictures 116 of the output data stream 108 would be indicated by apparatus 10 to be no-output pictures of bitstream 108, whereas the pictures 116 forming portion 114 would be signaled to the output pictures, i.e. pictures to be output at the decoding side. It is briefly noted that FIG. 17 indicates that the placement of pictures 116 belonging to portion 114 in between the pictures 116 forming the reference portion 112 by being filled with the input pictures 118 using time-division multiplex leads to a higher POC increasing rate as compared to the non-insertion of the pictures 116 belonging to portion 114, which fact is appropriately dealt with by apparatus 10 in managing the temporal prediction referencing, i.e. a modification of reference picture order count difference values and slice headers and/or references to a set of reference picture order count difference values. To be more precise, apparatus 10 may, for example, fill each picture 116 of data stream 108, belonging to reference portion 112, by adopting the one or more slices into which the respective input picture 118 of the respective input video stream 105 is coded in a manner corresponding to the description of FIG. 2, while concurrently revising the slice header 40 so as to account for the POC difference change of pictures 116 into which pictures of the same input video bitstream are multiplexed. Pictures 116 belonging to the reference portion 112 are, as just outlined, not output. They are no-output pictures. The collated video is defined by the output pictures 116 belonging to portion 114. Apparatus 10 is able to form the collated video simply by coding motion-compensation side information for the different areas of the pictures 116 belonging to portion 114.

In FIGS. 12 and 15, for example, it has been illustrated that the pictures 116 being part of portion 114, i.e. the SLCPs, are split up into areas wherein in each the temporal motion vectors are constant over the respective area, but the temporal motion-compensation side information is different between the individual areas. In FIG. 17, for example, subarea 132 of picture 116 belonging to portion 114 is, for example, coded using a motion-compensation side information which copies, in a translatory manner, a respective portion of equal size from the PSRs 116 belonging to input video data stream $105_1$ having output bitstream POC 1, for example, while the remaining area 134 of this SLOP 116 is coded using motion-compensation side information which copies in a, for example, translatory manner a respective portion of the same size and shape from the PSR 116 of the other input video bitstream $105_2$. The SLOP 116 of the next time instant, not shown in FIG. 17, may be coded using the same motion-compensation side information and subdivision into areas 132 and 134 or using a different setup. Imagine, for example, the use of the same coding of consecutive SLCPs. Further, imagine that one of areas 134 uses a zero motion vector, i.e. it simply spatially copies co-located portions of a respective input video data stream. In that case, such a composed video data stream would result in the presentation/display of one of the input video data streams with another of the input video data streams presented or overlaid at a certain area of the input video data stream. This example was shown in FIGS. 12 and 14. In case of using a translatory copying of picture content of PSRs, apparatus 10 may code the areas 132 and 134 of SLCPs 116 in a manner described above with respect to FIG. 3, namely using spatial prediction and/or using skip mode for any block following a first block of the respective area 132 and 134, respectively, for example. Apparatus 10 could even code the SLCPs using prediction residual data or could code further areas other than areas 132 and 134 temporally predicted in PSRs, using still picture coding or the like.

Figure 18A:
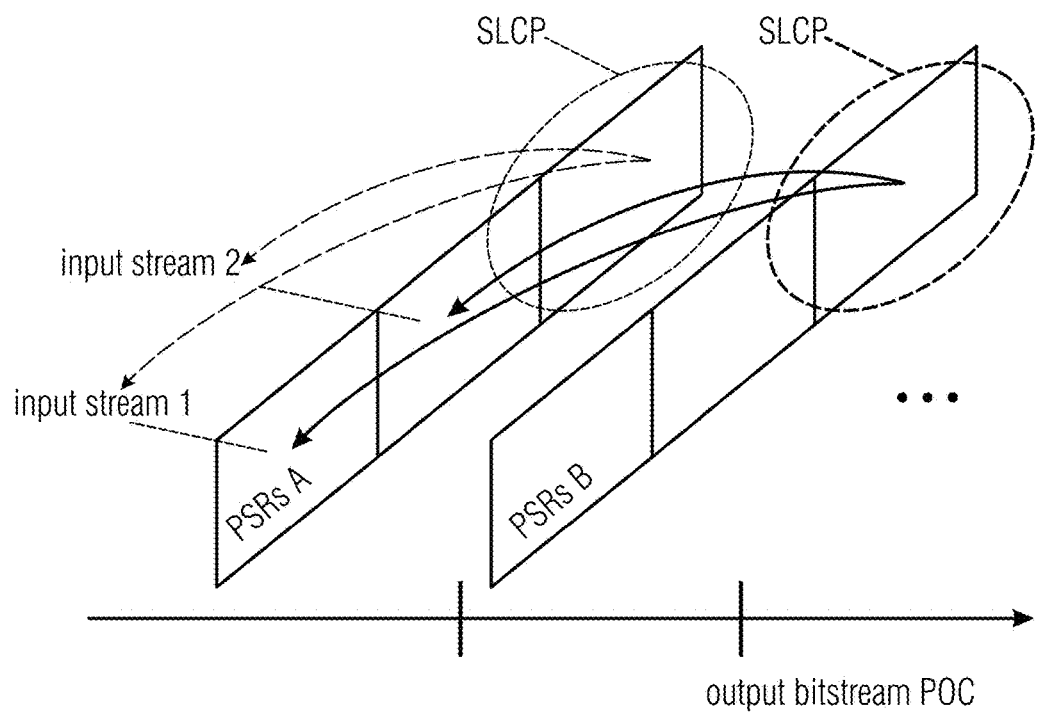
FIGS. 18a-18b show an illustration of SLOP with stitched references.
Figure 18B:
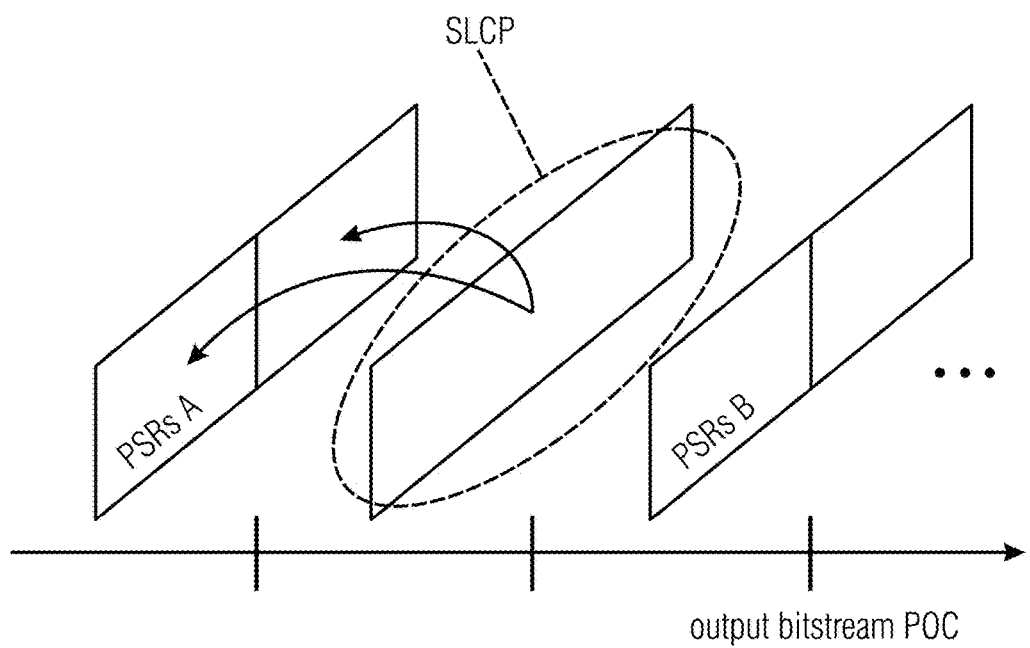

When using the stitched references approach for multiplexing the input video data streams as outlined above in FIGS. 14 and 16, several possibilities of SLOP bitstream positions exist, i.e. for positioning portion 114 of the composed video bitstream 108 with two possibilities being illustrated in FIGS. 18a and 18b. FIG. 18b shows the possibility which was already depicted above in FIG. 16: the input video data streams 105 are spatially stitched together by apparatus 10 until first pictures 116 having one tile for each input video data stream, and SLCPs are interspersed therebetween and composed, using motion-compensated prediction, on the basis of the stitched reference pictures. The SLCPs 116 have an increased size corresponding to the spatial stitching of the various input video bitstreams, but cropping out a part of the SLCPs may be used to reduce the size of the pictures to be displayed and accordingly, the size of the collated video thus defined by apparatus 10.

While FIG. 18b thus temporally interleaves pictures 116 belonging to portion 114 and pictures belonging to reference portion 112, in accordance with FIG. 18a, the SLCPs, i.e. the collated video portion 114, is spatially attached to the pictures 116 of the composed video bitstream 108. It is worthwhile to note that owing to the temporal motion-compensated prediction used to compose the picture content of the SLCPs, a time-delay results between the collated video defined by portion 114, i.e. the SLCPs, and the referenced content of the input video data streams 105.

Thus, in the case of FIG. 18a, apparatus 10 may compose the pictures 116 of the composed video data stream 108 so as to comprise one tile per input video data stream 105, and a further additional tile for conveying portion 114. If one or more of the input video data streams already is partitioned into multiple tiles, then one tile per tile of the input video data streams may be present in the composed video data stream 108. When using different frame rates of the input video data streams 105 on the one hand and the SLCPs on the other hand, then some of the tiles may be filled with dummy data, this being true for any of the input video data stream and the SLCPs, whichever has a lower frame rate.

Thus, FIGS. 18a and 18b showed that the SLOP slice data may be inserted by apparatus 10 in the form of individual pictures, for example with distinct POC values following the referenced PSRs or the SLCPs can be stitched with the data of the PSRs following the referenced PSRs.

When using the stitched references approach, the SLOP may be cropped back to envisioned output picture size, e.g. picture size of, for example, one of the individual input streams.

Summarizing FIGS. 17 to 18b, apparatus 100 may act as follows:

In accordance with FIG. 17, the apparatus 100 may fill pictures $P_{i(N+K)+n}^{composed}$ of the composed video data stream by collecting and copying motion-compensation side information and prediction residual data of pictures $P_i^n$ of index i of input video data streams n with 0<n<=N (N being the number of input video data streams and K being the number of pictures—intermediate pictures of intermediate portion or pictures belonging to the collated video (or output) portion—inserted by apparatus 100 per N pictures $P_i^n$ of the same index i), and compose the collated video by referencing, via motion-compensated temporal prediction, from picture $P_{i(N+K)+N+k}^{composed}$, 0<k<=K (k indexing sequences of inserted pictures) of the composed video data stream, one or more of pictures $P_{i(N+K)+1}^{composed} \ldots P_{i(M+K)+N}^{composed}$ of the composed video data stream additionally including for pictures of a sequence k>1 (if any), optionally, pictures $P_{i(N+K)+N+1}^{composed} \ldots P_{i(N+K)+N+k-1}^{composed}$, forming the "referenced total area" for picture $P_{i(N+K)+N+k}^{composed}$. The parameter K may be one, as depicted in FIG. 17, but for enabling a higher SLCP frame rate—the K sequences may include two or more sequences of output pictures forming the output portion 114—or in order to achieve a multi-stage referencing approach as outlined hereinafter—the K sequences may include at least one sequence of intermediate pictures and at least one at least one sequence of output pictures—.

Alternatively, according to FIG. 18a, apparatus 100 fills the N tiles $T_n$ of picture $P_{(1+k)i}^{composed}$ of the composed video data stream by collecting and copying motion-compensation side information of pictures $P_i^n$ of the input video data streams n, respectively, and composes the collated video by referencing, via motion compensated temporal prediction, from pictures $P_{(1+K)i+1}^{composed} \ldots P_{(1+K)i+K}^{composed}$ of the composed video data stream, one or more of tiles $T_1 \ldots T_N$ of pictures $P_{(1+K)i}^{composed}$, additionally including for pictures of a sequence k>1 (if any), optionally, pictures $P_{(1+K)i+1}^{composed} \ldots P_{(1+K)i+k-1}^{composed}$, forming the "referenced total area" for picture $P_{(1+K)i+k}^{composed}$. The parameter K may be one, as depicted in the FIG. 18a, but for enabling a higher SLCP frame rate—the K sequences may also include two or more sequences of output pictures forming the output portion 114—or in order to achieve a multi-stage referencing approach as outlined hereinafter—the K sequences may include at least one sequence of intermediate pictures and at least one at least one sequence of output pictures.

Alternatively, apparatus 10 fills tiles $T_N$ of picture $P_i^{composed}$ of the composed video data stream by collecting and copying motion-compensation side information and prediction residual data of picture $P_i^n$ of the input video data stream n and composes the collated video by referencing, via motion-compensated temporal prediction, from tile $T_{N+1}$ of picture $P_i^{composed}$ of the composed video data stream, the tiles $T_1 \ldots T_N$ of pictures $P_{i-1}^{composed}$ of the composed video data stream, forming the "referenced total area" for tile $T_{N+1}$ of picture $P_i^{composed}$. In a manner similar to the case denoted by K>1 above, more than one tile may be inserted per picture $P_i^{composed}$ for multi-stage prediction as described in more detail below, i.e. in order to form an intermediate portion of the composed video data stream.

The referencing in the course of composing the collated video may be performed by apparatus 100 by partitioning the output area A of the respective picture or tile of the composed video data stream into J areas $A_j$, each area of at least a subset of these areas $A_j$, 0<j<=J, referencing one or two (or even more) portions out of the respective "referenced total area" using a set $m(A_j)$ of one or more constant motion vectors (with associated reference pictures out of the "referenced total area"), i.e. m(p)=m(q) for all blocks p and q within $A_j$, or a set of one or more motion vectors gradually varying along the horizontal and/or vertical dimension, i.e. |m(p)−m(q)|<threshold for all neighboring blocks p and q within $A_j$, so as to achieve magnifying or shrinking effects as further described below. Thus, spatial sub-portions out of the "referenced total area" may be, in the first case, copied in a translator manner and, in the second case, in intra-block sense translatory but in inter-block sense magnifying and/or shrinking manner. The areas of the at least subset of areas $A_j$ may be composed of temporally coded blocks. For coding the "output area", the smallest possible block size available for coding the motion-compensation side information may be chosen for the gradually varying case. The at least subset of areas may, in terms of their outlines and in number, be constant in time for the sequence of pictures $P_{i(N+K)+N+k}^{composed}$, pictures $P_{(1+K)i+k}^{composed}$ and tile $T_{N+1}$ of pictures $P_i^{composed}$ respectively, or may change along the sequence) (indexed by i). The output area may coincide with the picture area of the sequence of pictures $P_{i(N+K)+N+k}^{composed}$, the picture area of pictures $P_{(1+K)i+k}^{composed}$ or the tile area of tile $T_{N+1}$ of pictures $P_i^{composed}$, respectively, are may be a part thereof with the remainder being cropped-out. There may be one area having a zero motion vector. As described, one or more of the areas $A_j$ may have a set $m(A_j)$ of more than one motion vector, i.e. $m(A_j)=\{(m_1, \Delta P_1), \ldots, (m_M, \Delta P_M)\}$ with $m_l$ (0<l<M) denoting a motion vector referencing picture $P_{current-\Delta P_l}^{composed}$ being the $\Delta P_l^{th}$ picture of the composed video data stream upstream the current picture comprising current area $A_j$. In case of two motion vectors, i.e. M=2, this may be called bi-prediction. For each motion vector, the motion-compensation side information may also comprise a prediction/weighting factor $\alpha_l$ resulting in a motion-compensated prediction according to "sum the copies of $P_{current-\Delta P_l}^{composed}$ at relative displaced location $m_l$ weighted by $\alpha_l$ to obtain $A_j$". By this measure, an overlay between two or more input video data streams may be achieved at area $A_j$. By gradually changing the weights $\alpha_l$ over time in the sequence of output areas for $A_j$, a blending between two input video data streams may be achieved.

Overlapping or outside the just-described subset of areas, there may be a spatial portion of the "output area" within which the collated video portion 114 is coded using prediction residual data. Into such spatial portion, special content such as a non-moving image, a service logo or the like, could be coded. In areas outside the motion compensated areas $A_j$, spatial prediction modes may be used to lower the bit consumption for coding the output area of the collated video portion 114. Thus, there may be a purely intra-coded area within the output area.

In order to reduce the data rate for coding the output area of the collated video portion 114, the apparatus 100 could use temporal prediction of motion-compensation side information, namely between the consecutive pictures of the collated video portion 114, i.e. between consecutive ones of the sequence of pictures $P_{i(N+K)+N+k}^{composed}$, consecutive ones of the sequence of pictures $P_{(1+K)i+k}^{composed}$ and consecutive ones of $T_{N+1}$ of the sequence of pictures $P_i^{composed}$, respectively.

The filling by collecting and copying may be performed by apparatus 100 in the manner outlined above with respect to FIG. 3. Apparatus 100, for example, additionally revises the referencing to reference pictures in the slice headers in transferring the slices from the copied pictures of the input video data streams to the respective tiles or picture of the composed video data stream, and for example filling remainder areas not filled in the respective tile or picture of the composed video data stream by the collecting and copying of dummy data as described above with respect to FIG. 15.

Additionally, in the case of FIG. 17, apparatus 10 may signal that pictures $P_{i(N+K)+1}^{composed} \ldots P_{i(N+K)+N}^{composed}$ are no-output pictures whereas pictures $P_{i(N+K)+N+k}^{composed}$ are output pictures or intermediate pictures, wherein pictures with k=K may be output pictures. In the case of FIG. 18a, apparatus 10 may signal that pictures $P_{(1+K)i}^{composed}$ are no-output pictures whereas pictures $P_{(1+K)i+k}^{composed}$ are output pictures or intermediate pictures, wherein pictures with k=K may be output pictures, and in case of FIG. 18b, apparatus 10 may signal that all pictures of the composed video data streams are output pictures, however with signaling that all but tile $T_{N+1}$ are to be cropped-out in displaying/reproducing the composed video data stream. The latter cropping signaling may also be applied to apparatus 10 with respect to FIG. 18a: merely a portion out of the output pictures among pictures $P_{(1+K)i+k}^{composed}$ may be used for generating the output of the composed video data stream, i.e. the other portion of the output pictures may be cropped.

Figure 21:
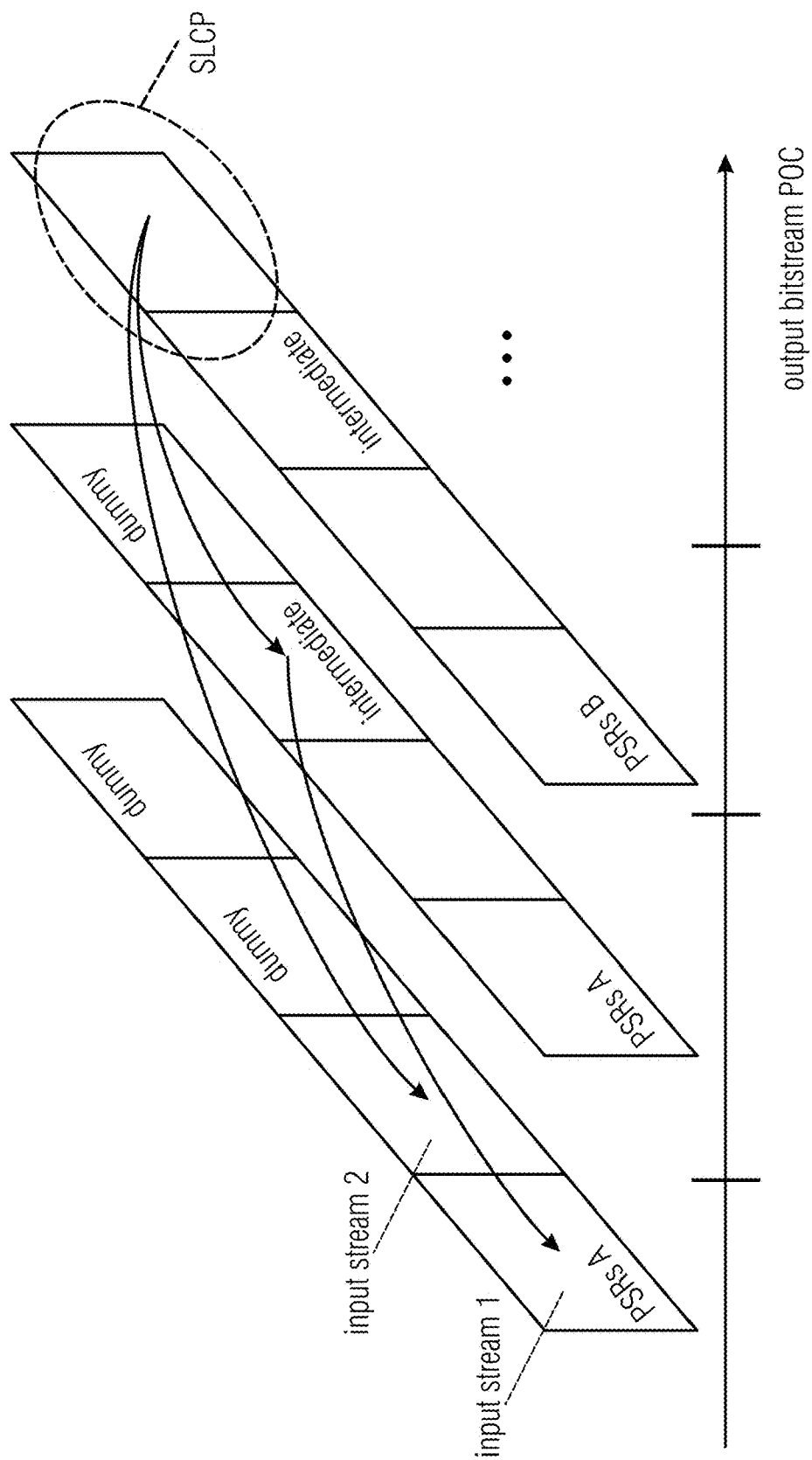
FIG. 21 shows an example of Multi-Step SLOP for iterative resampling.

As will be outlined next with respect to FIG. 21, the video composition apparatus may be configured to fill an intermediary portion of the pictures of the composed video datastream by referencing, via motion-compensated temporal prediction, the reference portion 112 of the composed video datastream, wherein the collated video forming portion 108 of the pictures of the composed video datastream is filled with a collated video by referencing, via motion-compensated temporal prediction, the first portion of the composed video datastream indirectly via the intermediary portion. For example, besides the already mentioned tiles $T_1$ to $T_{N+1}$ other tiles such as tiles $T_{N+2}$ may be generated by apparatus 100 with as well with tile $T_{N+1}$ of picture $P_i^{composed}$ of the composed video data stream referencing one or more of the tiles $T_1 \ldots T_N$ of picture $P_{i-2}^{composed}$ of the composed video data stream indirectly via tile $T_{N+2}$ of picture $P_{i-1}^{composed}$ the composed video data stream which, in turn, references one or more of the tiles $T_1 \ldots T_N$ of picture $P_{i-2}^{composed}$ of the composed video data stream.

In other words, as only the SLOP of portion 114 is to be output by a decoder and/or displayed while PSRs are used solely for referencing by the SLOP and—if present—the intermediary portion of the composed video datastream and not output, the applied codec underlying the input video data streams 105 as well as the composed video data stream 108 should support the concept of pictures available for references that are not output or any comparable mechanism should be applied on the system layer, for example. Alternatively, for codecs that lack this feature, such as H.264/AVC, for example, the stitched reference approach may be used instead and the data of the SLOP and the PSRs following the referenced PSRs may be stitched into single pictures as described above.

As only the SLOP of portion 114 is intended for output by the decoder, with any of the presented approaches and their combinations, it may be desirable to crop the decoded pictures to be output by the decoder, either to remove image content of PSRs or to adjust spatial dimensions of the decoded SLOP that was carried as an individual picture as described above.

Various aspects motivate structuring the SLOP by tiles or slices. First, the SLOP may follow a tile/slice structure employed in one or more of the input streams of the structure of the stitched reference pictures, thereby not necessitating new initialization of parallel decoding infrastructures for each SLOP, i.e. for each picture at least a spatial part of which belongs to portion 114. Second, efficient compression of the SLOP slice data may motivate a tile or slice structure that follows the distribution of prediction vectors so that areas of equal, similar or related prediction vectors can be encoded efficiently into a single tile and/or slice.

There are use cases where blending two input videos (in parts or complete) for the resulting SLOP (again in parts or complete) may be desired. An exemplary use case described before as referencing two portions out of the respective "referenced total area" is given in FIG. 19 with a virtual set-top box application that overlays a Graphical User Interface (GUI) on video content in the compressed domain. In this example, Input Stream 1 is overlaid with a GUI in form of another Input Stream 2 for the Composition.

Figure 19:
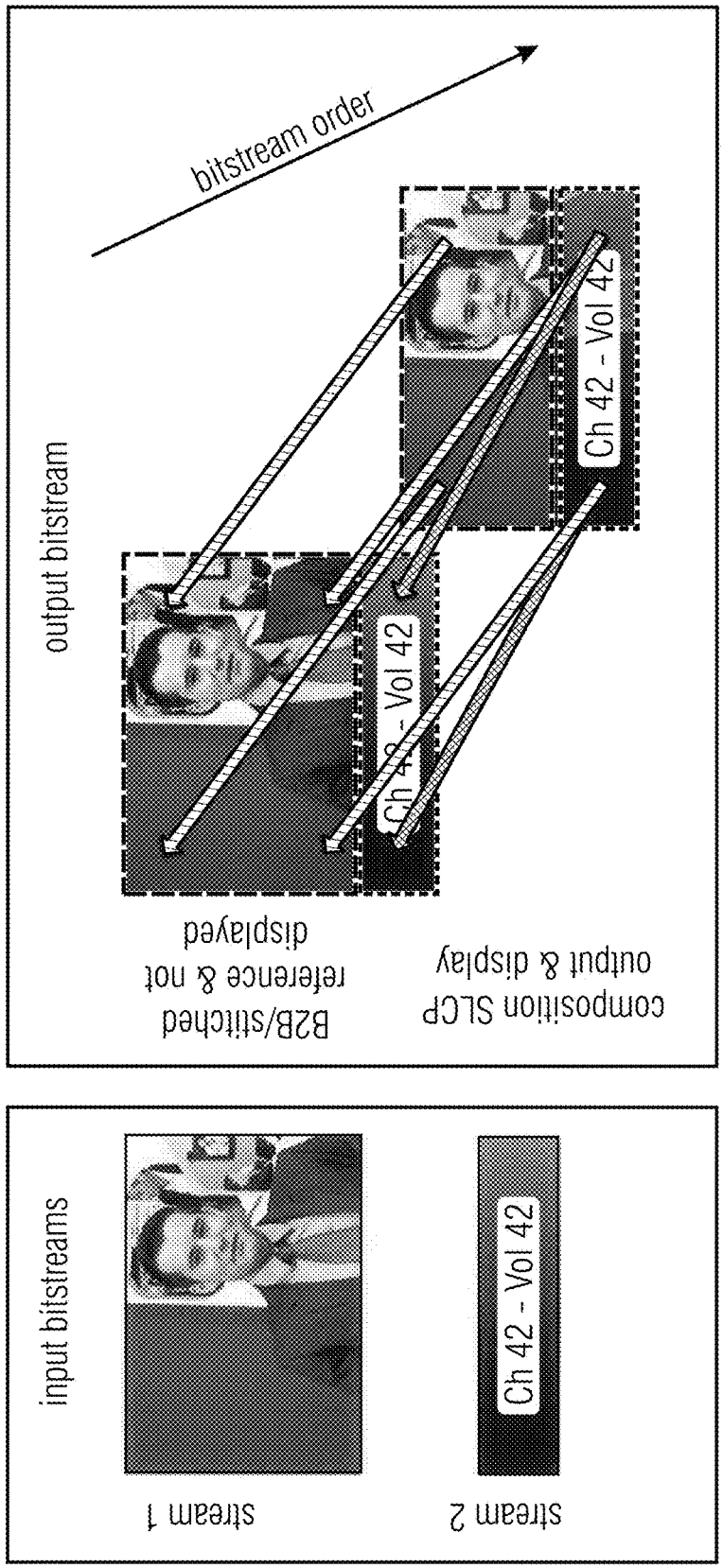
FIG. 19 shows SLOP with alpha blending through weighted prediction.

The lower dashed rectangle in the composition in FIG. 19 is referred to as the alpha blended region in the following. A weighed prediction procedure is employed to generate the desired effect for the alpha blended regions of the SLOP. The sample values in the alpha blended region are predicted from multiple reference pictures (when using the B2B reference approach) or multiple spatial regions of a single reference picture (when using the stitched reference approach), each with an individual weight. Combining several alpha blended regions within a SLOP from the same or various input streams is possible, such as a GUI overlay and a channel, station or service logo.

Figure 20:
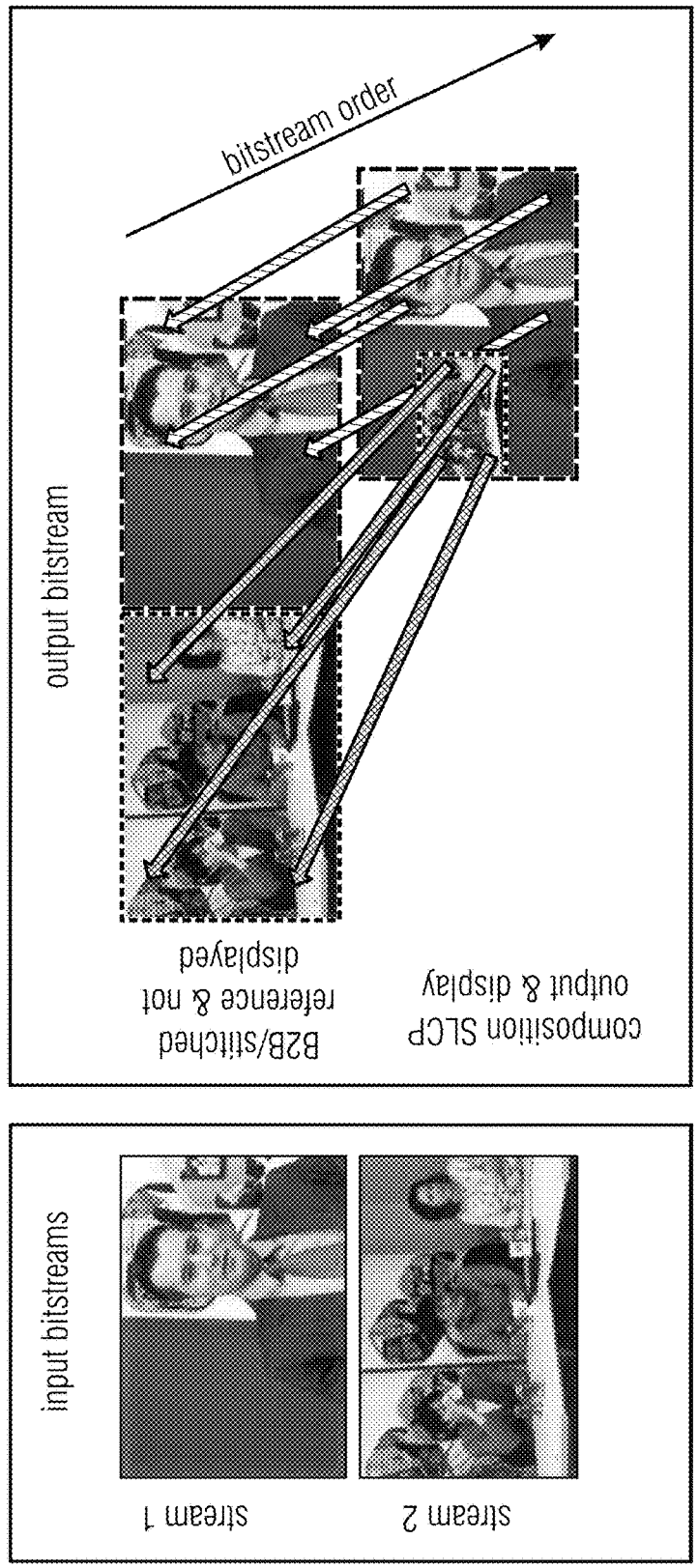
FIG. 20 shows SLOP using resampling through varying prediction vectors.

A further feature of SLCPs described before as gradually varying motion vectors is illustrated in FIG. 20 based on a Picture-in-Picture applications. This concept incorporates spatial resizing of input stream picture content for the composition. This is achieved by providing prediction vectors on the smallest possible coding unit and/or prediction unit block granularity. The prediction vector coordinates are adjusted in the course of traversing the respective region within the SLOP in order to resample the targeted input bitstream. The result in the decoded SLOP is a spatially different representation of part of or the complete respective input bitstream image content.

For each sample position (i.e. coding unit and/or prediction unit) of the resampled region in the SLOP, weighted prediction from multiple (e.g. neighboring) coding unit and/or prediction unit of the input pictures may be applied to increase quality of the respective resampled picture region.

Generally, it should be avoided to process the SLOP in an in-loop filter such as a deblocking filter in order to not introduce differences with respect to the pictures of the input bitstreams. However, in order to reduce possible quality degradation introduced by the resampling procedure, additional in-loop filter, such as deblocking filter or SAO filter in HEVC, may be used on the whole SLOP or the subsampled regions as fit.

Under some circumstances the creation of a desired composition from input bitstreams in a single output bitstream may necessitate several prediction steps, i.e. several additional no-output pictures to be added to the output bitstream. Intermediate pictures are predicted using the PSRs and/or earlier produced intermediate pictures until the final desired composition can be created in a SLOP that references one or more of these intermediate pictures and/or even the initial PSRs while only the SLOP is intended for output.

A first example for such circumstances is iterative subsampling, where in a first intermediary portion of the composed video datastream, an input bitstream image content is spatially subsampled in the horizontal direction using weighted bi-prediction and in a second step, the content of this intermediary picture is spatially subsampled in the vertical direction using weighted bi-prediction again and the final SLOP composition is created to be output as illustrated in FIG. 21.

Another example of such circumstances is the use of compound prediction in VP9 to create an alpha blending effect and using the resulting intermediate picture as reference for the SLOP to be output.

As the previous sections have shown, many applications and use cases can be implemented by adjusting the prediction vectors of the SLOP accordingly. A further example apart from composing typical video content is providing the letters of an alphabet or sets thereof as image content of input bitstream(s) to compose messages in the SLOP using the correct prediction vectors to the input bitstream picture area depicting the individual letters.

While all given examples employed a specific referencing structure, the presented concepts are applicable to many more referencing structures. It is also worth mentioning that the described SLOP concept likewise allows processing of more than two input video bitstreams.

Like for GRPs, SLOP slice data can be pre-encoded for insertion into arbitrary bitstreams since their content depends only on high-level parameters such as picture dimensions and displacement.

As already described above with respect to the video composition apparatus of FIGS. 1 to 10, the video composition apparatus 100 described above with respect to FIGS. 11 to 21, may be used within a system as shown in FIG. 5, wherein however the plurality of video encoders may, as described above, have more freedom in generating the input video data streams as described with respect to FIGS. 11 to 21. The request 60 could be treated by apparatus 100 as requests for changing the SLCPs, i.e. the composition of the reference input video data streams to the final collated video. The requests may stem from a client also comprising the decoder or an operator of a server comprising apparatus 100.

In-band or out-of-band signaling of fulfilled encoding constraints that are necessitated for stitching, insertion of GRPs and/or composition via SLCPs as described allows systems to negotiate and/or detect that incoming streams can be stitched for further processing as described above. Therefore, signaling, e.g. in SDP for RTP streaming or in MPD for DASH-based streaming or further may be used as described above. FIG. 22 exemplarily describes respective signaling in the form of an SEI message.

composition_enabled_type indicates the type of composition (processing) that can be applied to the current bitstream to use for composition of an output bitstream where the current bitstream is a sub-bitstream or part (tile/slice) of the composed bitstream. composition_enabled_type with a value equal to 0 indicates that the current bitstream can be stitched as described in [1] with other bitstreams fulfilling the constraints described in [1] with IDR alignment. composition_enabled_type with a value equal to 1 indicates that the current bitstream can be stitched as described in [1] with other bitstreams fulfilling the constraints described in [1] but IDR pictures can be converted to I slices of a trailing picture and can be merged with non I slices, i.e. composition_enabled_type with a value equal to 1 indicates that IDRs or IRAPs do not activate an SPS with different values than the previously active SPS if parameter set activation happens at all. composition_enabled_type with a value of 2 additionally indicates that TVMP is further restricted and that pictures with temporal_id_plus1 less or equal to max_temporial_id_plus1_TMVP_disabled are not used as reference for TMVP.

max_temporal_id_plus1_TMVP_disabled indicates the upper boundary value of temporal_id_plus1 of pictures to be not used as reference for TMVP.

In conjunction with the proposed SEI message, existing SEIs can be used for negotiation that make the bitstream processing easier. An example is the structure_of_pictures_info SEI where the GOP structure of different bitstreams is summarized and which can be used to identify switching points for GRP insertion. Any picture for which at the instance of decoding the lists RefPicSetStCurrBefore, RefPicSetStCurrAfter, or RefPicSetLtCurr, in other words the decoder reference picture buffer, only contain pictures with TemporalID lower or equal than the value of max_temporal_id_plus1_TMVP_disabled minus 1 can serve as switching point for GRP insertion.

Alternatively, SEI messages within the input datatreams could be used to signal the pictures that can serve as switching points for insertion of GRPs. On bitstream occurrence of this specific SEI, there shall be no picture included in RefPicSetStCurrBefore, RefPicSetStCurrAfter, or RefPicSetLtCurr that is used as reference for TMVP of pictures following in decoding order.

Even alternatively, a NAL unit type indicator value may be used for signaling for the above constraint in a fashion similar to STSA NAL unit signaling. On bitstream occurrence of a picture A of this specific NAL unit type indicator value, there shall be no picture included in RefPicSetStCurrBefore, RefPicSetStCurrAfter, or RefPicSetLtCurr that is used as reference for TMVP of pictures following in decoding order and including picture A.

Analogously, an SDP or MPD or any other form of signaling mechanism could include an equivalent signaling as the proposed SEI in order to convey this information out-of-band.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Yago Sanchez de la Fuente, Ralf Globisch, Thomas Schierl, and Thomas Wiegand, ⌐"Low Complexity Cloud-video-Mixing Using HEVC", ⌐Proceedings of IEEE Consumer Communications and Networking Conference, Las Vegas, Nev., USA, January 2014.
[2] Sullivan, Gary J., et al. "Overview of the high efficiency video coding (HEVC) standard." Circuits and Systems for Video Technology, IEEE Transactions on 22.12 (2012): 1649-1668.

The invention claimed is:

1. System comprising
at least one video encoder configured to provide at least one input video datastream; and
a video composition apparatus configured to compose a composed video datastream using at least one input video datastream, the composed video datastream and the at least one input video datastream being encoded using motion-compensated temporal prediction,
wherein the video composition apparatus is configured to compose the composed video datastream by
forming a sequence of inherited pictures of the composed video datastream with filling a spatial portion of the inherited pictures by collecting and copying motion-compensation side information and prediction residual data of the at least one input video datastream, wherein a spatial location of the spatial portion temporally changes from one inherited picture to the next in the sequence of inherited pictures, and
inserting at least one no-output picture into the composed video datastream between the inherited pictures of the sequence of inherited pictures, the at least one no-output picture referencing, via motion-compensated temporal prediction, a subset of the inherited pictures.

2. System according to claim 1, wherein the at least one video encoder is configured to provide the at least one input video datastream with restricting motion-compensation side information of the at least one input video datastream such that pictures of the at least one input video datastream do not, via motion-compensated temporal prediction, preceding pictures of the at least one input video datastream at portions extending beyond boarders of a predetermined stationary spatial area of the at least one input video datastream.

3. System according to claim 1, wherein the system comprises a plurality of video encoders comprising the at least one video encoder and the at least one video encoder is configured to provide the at least one input video datastream using a temporal prediction GOP structure which is synchronized among the plurality of video encoders.

4. System according to claim 1, wherein the at least one video encoder is configured to
provide the at least one input video datastream using temporal hierarchical coding and temporal motion-compensation side information prediction,
provide the at least one input video datastream such that a picture-scope temporal hierarchy layer ID is associated with each of pictures of the at least one input video data stream, and
restricting for one or more temporal hierarchy level IDs that pictures of the respective one or more temporal hierarchy level IDs the temporal motion-compensation side information prediction to the extent that pictures of the respective one or more temporal hierarchy level IDs are not referenced, via temporal motion-compensation side information prediction, by any other picture; and provide high-level syntax of the at least one input video datastream with a beyond-picture-scope temporal hierarchy layer ID discriminator guaranteeing for one or more temporal hierarchy level IDs that input pictures of the respective one or more temporal hierarchy level IDs are not referenced, via temporal motion-compensation side information prediction, by any other picture.

5. System according to claim 1, wherein the video composition apparatus is configured to insert one or more no-output pictures at a time instant at which the spatial portion spatially changes such that each of the one or more no-output pictures substitutes a reference picture among the inherited pictures preceding the time instant which is referenced, via motion-compensated temporal prediction, by motion-compensation side information by the collection and copying of which the spatial portion of any of the inherited pictures succeeding the time instant is filled.

6. System according to claim 5, wherein the video composition apparatus is configured to insert the one or more no-output pictures such that each no-output picture references, via motion-compensated temporal prediction, at a spatial portion spatially corresponding to the spatial portion to which the spatial portion changes at the time instant, the spatial portion of the reference picture which is substituted by the respective no-output picture.

7. System according to claim 5, wherein the video composition apparatus is configured to insert at the time instant at which the spatial portion spatially changes from a first one of the inherited pictures to a second one of the inherited pictures, immediately succeeding the first one of the inherited pictures in the sequence of inherited pictures, as many no-output pictures as there are reference pictures among the inherited pictures comprising and preceding the first one of the inherited pictures, referenced, via motion-compensated temporal prediction, by motion-compensation side information by the collection and copying of which the spatial portion of any of the inherited pictures comprising and succeeding the second one of the inherited pictures is filled.

8. System according to claim 1, wherein the video composition apparatus is configured to multiplex a plurality of input video datastreams, comprising the at least one input video datastreams, into the sequence of first pictures such that the sequence of inherited pictures is spatially subdivided into tiles, and such that each tile is formed from one of the plurality of input video datastreams, associated with the respective tile, by collecting and copying motion-compensation side information and prediction residual data of the associated input video datastream, wherein the spatial portion is defined by the tile with which the at least one input video datastream is associated and the spatial location of the spatial portion temporally changes from one inherited picture to the next in the sequence of inherited pictures responsive to a temporal change in the association between the tiles on the one hand and the plurality of input video datastreams on the other hand.

9. System according to claim 8, wherein the video composition apparatus is configured to insert no-output pictures at time instants at which an association between the tiles on the one hand and the plurality of input video datastreams on the other hand changes, the no-output pictures comprising motion-compensation side information moving a picture area of a tile associated with a predetermined one of the plurality of input video datastreams before a respective change to a picture area of a tile associated with the predetermined input video datastream after the change.

10. System according to claim 1, wherein the video composition apparatus is configured to control the temporal change of the spatial location of the spatial portion temporally changes responsive to external requests for a change.

11. System according to claim 1, configured to form the sequence of inherited pictures of the composed video datastream with filling the spatial portion of the inherited pictures such that the spatial portion of each of the inherited pictures is filled by collecting and copying motion-compensation side information and prediction residual data of exactly one of a sequence of input pictures of the at least one input video datastream.

12. System according to claim 11, wherein the video composition apparatus is configured to execute an external request for a change upon encountering a sequentially next one of the sequence of input pictures at which none of a current set of reference pictures is referenced, via temporal motion-compensation side information prediction, by any succeeding input picture.

13. System according to claim 12, wherein the video composition apparatus is configured to detect the encountering a sequentially next one of the sequence of input pictures at which none of a set of reference pictures is referenced, via temporal motion-compensation side information prediction, by any succeeding input picture on the basis of a picture-scope temporal hierarchy layer ID of the input pictures and a beyond-picture-scope temporal hierarchy layer ID discriminator comprised by high-level syntax of the at least one input video datastream guaranteeing for one or more temporal hierarchy level IDs that input pictures of the respective one or more temporal hierarchy level IDs not referenced, via temporal motion-compensation side information prediction, by any other input picture.

14. System according to claim 1, wherein the motion-compensation side information and prediction residual data are entropy coded, and the collection and copying is performed without entropy decoding.

15. System according to claim 1, wherein the forming the sequence of inherited pictures of the composed video datastream comprises collecting and copying slices of the at least one input vide datastream with leaving payload data of the slices unchanged and amending data in the slice header.

16. System according to claim 15, wherein the data in the slice header comprises a slice address and/or picture order count data and/or reference picture order count difference values and/or reference to a set of reference picture order count difference values and/or differentially coded quantization parameter.

17. System according to claim 1, wherein the at least one no-output picture is free of prediction residual data.

18. System according to claim 1, wherein the video composition apparatus is configured to insert the at least one no-output picture such that the at least one no-output picture references, via motion-compensated temporal prediction, the subset of the inherited pictures such that a spatial portion of input pictures of a sequence of input pictures of the at least one input video datastream is copied, by translation, into a spatial portion of the at least one no-output picture.

19. System according to claim 18, wherein the composed video datastream and the at least one input video datastream are encoded using motion-compensated temporal prediction in a block-granular manner and wherein the video composition apparatus is configured such that the at least one no-output picture's spatial portion is composed of a number of blocks a motion vector of which is equal to each other and coded within the composed video datastream for merely one of the number of blocks and using spatial prediction for block of the number of blocks other than the one block.

20. System according to claim 19, wherein the video composition apparatus is configured such that any block other than the one block is coded using a skip mode signaling the absence of prediction residual data and the adoption of motion-compensation side information from a neighboring block.

21. System according to claim 1, wherein the video composition apparatus is configured to build new parameter sets for the composed video datastream on the basis of the parameter sets of the at least one video input datastream.

22. A non-transitory digital storage medium storing an hierarchically temporally coded video data stream encoded using motion-compensated temporal prediction and motion-compensation side information prediction, wherein the hierarchically temporally coded video data stream signals a picture-scope temporal hierarchy layer ID for each picture of the hierarchically temporally coded video data stream and comprises high-level syntax with a beyond-picture-scope temporal hierarchy layer ID discriminator guaranteeing for one or more temporal hierarchy level IDs that pictures of the respective one or more temporal hierarchy level IDs are not referenced, via temporal motion-compensation side information prediction, by any other picture.

23. A non-transitory digital storage medium according to claim 22, wherein
the high-level syntax is contained in an SEI (supplemental enhancement information) message of the hierarchically temporally coded video data stream.

24. A non-transitory digital storage medium according to claim 22, wherein
the picture scope temporal hierarchy layer ID is signaled in the hierarchically temporally coded video data stream, for each picture in an access unit header associated with the respective picture 22, or within a slice header of slices of the respective picture.

25. A non-transitory digital storage medium storing a video data stream encoded using motion-compensated temporal prediction and motion-compensation side information prediction, wherein the video data stream distinguishes, by picture wise signaling,
first pictures at which none of a current set of reference pictures is referenced, via temporal motion-compensation side information prediction, by any succeeding picture of the video data stream, and
second pictures at which one of a current set of reference pictures is—or is candidate for being—referenced, via temporal motion-compensation side information prediction, by any succeeding picture of the video data stream.

* * * * *